(12) United States Patent
Ge et al.

(10) Patent No.: US 10,785,681 B1
(45) Date of Patent: Sep. 22, 2020

(54) METHODS AND APPARATUSES FOR FEATURE-DRIVEN MACHINE-TO-MACHINE COMMUNICATIONS

(71) Applicants: Yiqun Ge, Ottawa (CA); Wuxian Shi, Ottawa (CA); Wen Tong, Ottawa (CA); Qifan Zhang, Kanata (CA)

(72) Inventors: Yiqun Ge, Ottawa (CA); Wuxian Shi, Ottawa (CA); Wen Tong, Ottawa (CA); Qifan Zhang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/428,396

(22) Filed: May 31, 2019

(51) Int. Cl.

| | |
|---|---|
| *H04L 29/06* | (2006.01) |
| *H04W 28/06* | (2009.01) |
| *G06K 9/62* | (2006.01) |
| *H04W 4/70* | (2018.01) |
| *G06N 3/04* | (2006.01) |
| *G06N 3/08* | (2006.01) |
| *H04W 84/04* | (2009.01) |

(52) U.S. Cl.
CPC ............ *H04W 28/06* (2013.01); *G06K 9/623* (2013.01); *G06K 9/629* (2013.01); *G06N 3/0454* (2013.01); *G06N 3/0472* (2013.01); *G06N 3/08* (2013.01); *H04L 69/04* (2013.01); *H04W 4/70* (2018.02); *H04W 84/042* (2013.01)

(58) Field of Classification Search
CPC ...... G06K 9/623; G06K 9/629; G06K 9/3241; G06N 3/0454; G06N 3/0472; G06N 3/08; G06N 3/04; G06N 3/084; H04L 69/04; H04L 12/43; H04W 4/70; H04W 28/06; H04W 84/042; H04W 4/18; G06T 7/11; G06T 7/187; G06T 9/002; H04N 21/4314; H04N 21/8358

See application file for complete search history.

(56) References Cited

U.S. PATENT DOCUMENTS

| | | | | |
|---|---|---|---|---|
| 2003/0145323 | A1* | 7/2003 | Hendricks | H04N 21/4314 725/34 |
| 2005/0152382 | A1* | 7/2005 | Stirling | H04L 12/43 370/403 |
| 2009/0097702 | A1* | 4/2009 | Rhoads | H04N 21/8358 382/100 |
| 2012/0307886 | A1* | 12/2012 | Agarwal | H04W 4/18 375/240.02 |
| 2019/0082185 | A1* | 3/2019 | Satavalekar | G06T 7/11 |
| 2019/0287217 | A1* | 9/2019 | Cooke | G06N 3/0454 |
| 2019/0347549 | A1* | 11/2019 | Phanishayee | G06N 3/084 |
| 2019/0370667 | A1* | 12/2019 | Georgiadis | G06N 3/04 |

(Continued)

*Primary Examiner* — Le H Luu

(57) ABSTRACT

Methods and apparatuses for feature-driven machine-to-machine communications are described. At a feature encoder, features are extracted from sensed raw information, to generate features that compress the raw information by a compression ratio. The feature encoder implements a probabilistic encoder to generate the features, each feature providing information about a respective probability distribution that each represents one or more aspects of the subject. The probabilistic encoder is designed to provide a compression ratio that satisfies a predetermined physical channel capacity limit for a transmission channel. The features are transmitted over the transmission channel.

20 Claims, 11 Drawing Sheets

(56) References Cited

U.S. PATENT DOCUMENTS

| | | | |
|---|---|---|---|
| 2020/0090028 A1* | 3/2020 | Huang | G06K 9/3241 |
| 2020/0120340 A1* | 4/2020 | Park | G06T 9/002 |
| 2020/0134463 A1* | 4/2020 | Haidar | G06N 3/0472 |
| 2020/0134833 A1* | 4/2020 | Biswas | G06T 7/187 |
| 2020/0143240 A1* | 5/2020 | Baker | G06N 3/08 |

* cited by examiner

METHODS AND APPARATUSES FOR FEATURE-DRIVEN MACHINE-TO-MACHINE COMMUNICATIONS

FIELD

The present disclosure relates to machine-to-machine (M2M) communications in a network. In particular, the present disclosure relates to apparatuses and methods for feature-driven compression for M2M communications.

BACKGROUND

Machine-to-machine (M2M) communications is a technology that realizes a network for collecting information from devices (e.g., sensors, smart meters, Internet of Things (IoT) devices, and/or other low-end devices) that are typically massively and densely deployed, and for transmitting information captured by those devices to other applications in the network. M2M networks may be wired or wireless and may have a relatively large geographical distribution (e.g., across a country or across the world). M2M communications typically do not involve direct human intervention for information collection.

Developments for 5G New Radio (NR) system include features to support massive machine type communications (mMTC) that connects large numbers (e.g., millions or billions) of IoT equipment by a wireless system. It is expected in the near future that the amount of M2M communications conducted over-the-air will bypass those of human-related communications. Accordingly, it would be desirable to provide ways to better support large-scale M2M communications.

SUMMARY

In various examples disclosed herein, methods and systems are described that enable multiple sensors to observe and gather information about a common subject. The sensors extract and transmit features or textures from the raw information to a core network. The use of trained encoder and decoder DNNs enable an optimal compression ratio to be used, without required prior knowledge (inherent or structural) about the raw information or the information source. The trained encoder and decoder DNNs also take into account the characteristics of the physical transmission channel. The present disclosure also described example methods for facilitating cooperation among multiple sensors observing a common subject, which may help to reduce some types of redundancies and alleviate overloaded wireless transmission system.

In some example aspects, the present disclosure describes an apparatus for feature-based compression. The apparatus includes: a sensing unit configured to capture a set of raw information about a subject; a feature encoder configured to extract one or more features from the set of raw information, to generate a set of features that compresses the raw information by a compression ratio; the feature encoder implementing a probabilistic encoder to generate the set of features, each feature providing information about a respective probability distribution that each represents one or more aspects of the subject; the probabilistic encoder being designed to provide the compression ratio that satisfies a predetermined physical channel capacity limit for a transmission channel; and a transmitter configured to transmit the set of features over the transmission channel.

In any of the examples, the probabilistic encoder may be implemented using an encoder deep neural network (DNN), and the encoder DNN may be trained to satisfy: a first target of maximizing likelihood between a set of recovered information at a corresponding decoder DNN, and a second target of minimizing an upper boundary of mutual information to be within the predetermined physical channel capacity limit.

In any of the examples, the encoder DNN and the decoder DNN may be trained together.

In any of the examples, the compression ratio provided by the trained encoder DNN and the decoder DNN may have been determined by performing training on a plurality of candidate encoder and decoder DNN pairs, each candidate encoder and decoder DNN pair providing a respective different compression ratio, and selecting the candidate encoder and decoder DNN pair and associated compression ratio that minimizes the upper boundary of mutual information.

In any of the examples, the apparatus may also include: a historical database storing at least one previously transmitted feature; and the transmitter may be configured to transmit a reduced set of features over the transmission channel, the reduced set of features omitting any feature that is unchanged compared to the at least one previously transmitted feature.

In some example aspects, the present disclosure describes an apparatus for feature-based compression. The apparatus includes: a sensing unit configured to capture a set of raw information about a subject; a feature encoder configured to extract one or more features from the set of raw information, to generate a set of features that compresses the raw information by a compression ratio; the feature encoder implementing a probabilistic encoder to generate the set of features, each feature providing information about a respective probability distribution that each represents one or more aspects of the subject; and a transmitter configured to: assign a sub-channel for transmission of each respective feature, the assigning being based on a relative importance of each feature; and transmit the set of features over the sub-channels.

In any of the examples, each feature may indicate an expectation value of the respective probability distribution and a variance value of the respective probability distribution, and the relative importance of each feature may be determined based on the variance value of each respective feature.

In any of the examples, the transmitter may be further configured to: select a transmission scheme for each assigned sub-channel, the transmission scheme being selected to indicate the variance value of the feature assigned to each respective sub-channel; and transmit the expectation value of each feature over the respective sub-channel in accordance with the respective transmission scheme.

In any of the examples, the transmitter may be further configured to: generate a control message or header indicating the selected transmission scheme and assigned sub-channel for each feature; and transmit the control message or header.

In any of the examples, a first feature having a first variance value and a second feature having a second variance value similar to the first variance value are assigned to the same sub-channel for transmission.

In any of the examples, the probabilistic encoder may be implemented using an encoder deep neural network (DNN).

In any of the examples, the encoder DNN may be trained to satisfy: a first target of maximizing likelihood between a set of recovered information at a corresponding decoder DNN, and a second target of minimizing an upper boundary of mutual information to be within the predetermined physical channel capacity limit.

In some example aspects, the present disclosure describes a method for managing a plurality of sensors monitoring a common subject, each sensor generating and transmitting a respective set of features representing one or more aspects of the subject. The method includes: determining a correlated feature that is highly correlated between a first set of features generated by a first sensor and a second set of features generated by a second sensor; generating a control message to the first sensor to cause the first sensor to omit the correlated feature from transmission; and reconstructing the first set of features from a transmission from the first sensor by filling in the omitted correlated feature.

In any of the examples, the first set of features may be reconstructed by copying the correlated feature from the second set of features received from the second sensor.

In any of the examples, the method may also include: determining that the correlated feature is a background feature that is unchanged over a predetermined time period; and the first set of features may be reconstructed by copying the correlated feature from a historical database containing a previously transmitted instance of the background feature.

In any of the examples, a same or different control message may be generated to cause the first sensor and the second sensor to omit the background feature from transmission.

In any of the examples, the method may also include: determining a requested set of features that is requested by an application, wherein the requested set of features is a subset of the first set of features; generating the control message to the first sensor to cause the first sensor to transmit only the subset of features; and reconstructing the first set of features from a transmission from the first sensor by filling in untransmitted features with random values.

In any of the examples, a same or different control message may be generated to cause the first sensor and the second sensor to alternately transmit or omit the correlated feature.

In any of the examples, all features in the first set of features may be highly correlated with the second set of features, and the control message may cause the first sensor to enter a sleep mode.

In any of the examples, the first sensor may have a poorer physical layer transmission performance than the second sensor.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
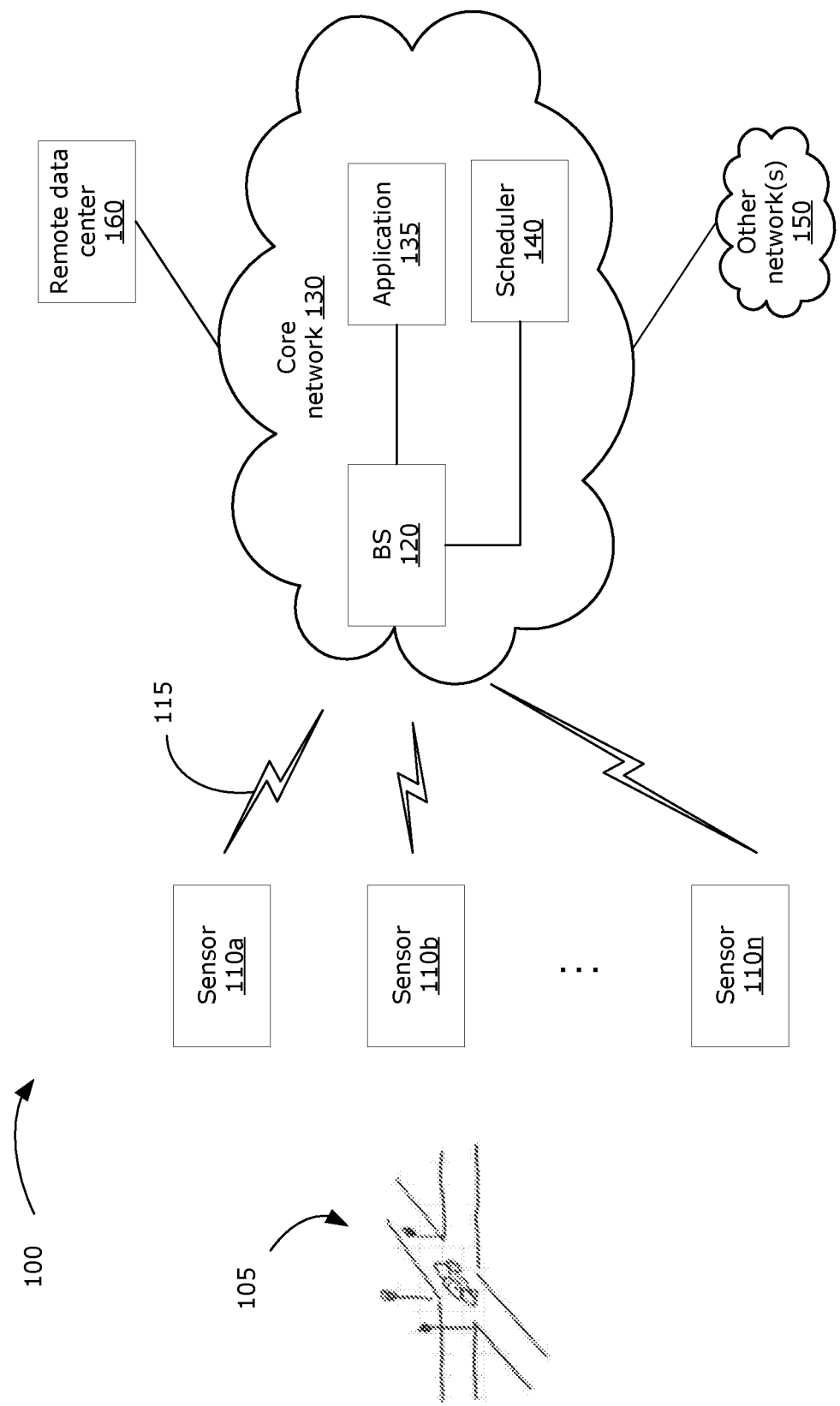
FIG. 1 is a schematic diagram illustrating an example system for M2M communications, in which examples described herein may be implemented.

FIG. 1 is a schematic diagram illustrating an example system for machine-to-machine (M2M) communications, in which examples described herein may be implemented. Although described as being a system 100 for M2M communications, it should be understood that other types of wired or wireless communications may be carried out using the system 100. For example, the system 100 may include components, not shown in FIG. 1, for human-based communications. In some examples, the system 100 may be dedicated to M2M communications.

In the example shown, the system 100 includes a plurality of sensors 110a-110n (generically referred to as sensor 110) that are used to gather information about a subject 105 of interest. Different sensors 110 may be used to monitor a common subject 105, and to gather information from different perspectives and/or to gather different types of information. For example, one sensor 110a may gather visual information from one angle, another sensor 110b may gather visual information from another angle, and another sensor 110n may gather audio information. Each sensor 110 may be any suitable information-gathering device, such as an Internet of Things (IoT) device, a smart meter, a wireless sensor, a machine type communication (MTC) device or other such information-gathering device.

In FIG. 1, each sensor 110 collects information about the observed subject 105 and transmits information, over a wireless radio channel, to a base station (BS) 120 via a wireless connections 115. For example, the BS 120 may include (or be) one or more of several well-known devices, such as a base transceiver station (BTS), a radio base station, a Node-B (NodeB), an evolved NodeB (eNodeB), a Home eNodeB, a gNodeB (sometimes called a "gigabit" Node B), a transmission point (TP), a transmit and receive point (TRP), a site controller, an access point (AP), or a wireless router, among other possibilities. Although only one BS 120 is shown in FIG. 1, it should be understood that there may be a plurality of BSs 120 in the system 100. A plurality of BSs 120 may be managed by a radio network controller (RNC) or a base station controller (BSC). In examples where an RNC or BSC is present in the system 100, one or more functions described herein as being implemented at the BS 120 may instead by implemented at the RNC or BSC. For simplicity, the present disclosure will discuss implementation at the BS 120 (instead of at the RNC or BSC), however it should be understood that this is not intended to be limiting. Each BS 120 may communicate with and manage a respective plurality of sensors 110. Each sensor 110 may communicate with and be managed by a respective one BS 120. In some cases, a sensor 110 may communicate with and/or be managed by a plurality of BSs 120. In some examples, different sensors 110 may transmit information to different BSs 120, and may use different channels for the wireless communication 115. For convenience, the BS 120 will be referenced in the singular, however it should be understood that there may be a plurality of BSs 120, and the functions described for a BS 120 may be performed by multiple BSs 120.

The BS 120 may be part of a core network 130. Alternatively, the BS 120 may be outside of the core network 130 (e.g., part of a separate radio access network (RAN)) and may be used to relay information between the sensors 110 and the core network 130. Other network(s) 150 (e.g., the Internet) and/or a remote data center 160 may be connected with the core network 130. The core network 130 may serve as a gateway access from the sensors 110 to the remote data center 160 and/or other network(s) 150.

The core network 130 may implement an application 135 (e.g., a machine application) that may synthesize and process the received information from multiple sensors 110, for example in order to make a decision or intervention based on observations about the subject 105. The application 135 may be implemented at one or more physical components (e.g., may be implemented at a backend server, or two servers may together provide all the functions of the application 135) of the core network 130. In the example of FIG. 1, the application 135 is shown as being part of the core network 130. In other examples, the application 135 may not be part of the core network 130. For example, the application 135 may be implemented at a BS 120 that is outside of the core network 130, may be implemented using a relay, and/or may be implemented at the remote data center 160 or in the other network(s) 150, among other possibilities. In the present disclosure, for convenience, examples may be described in which the application 135 is at the core network 130. However, it should be understood that such examples are not intended to be limiting.

The core network 130 may also implement a scheduler 140 that helps to manage operation of the sensors 110. For example the scheduler 140 may (e.g., in cooperation with the application 135) determine particular sensors 110 should operate at particular times, to collect particular information about the observed subject 105. Examples of the management performed by the scheduler 140 will be discussed further below. Although FIG. 1 shows the application 135 and the scheduler 140 as separate components of the core network 130, it should be understood that the application 135 and the scheduler 140 may be implemented as a single component, for example in a server of the core network 130. In other examples, the application 135 may be implemented outside of the core network 130 and the scheduler 140 may be implemented in the core network 130. Other such variations may be possible.

Figure 2:
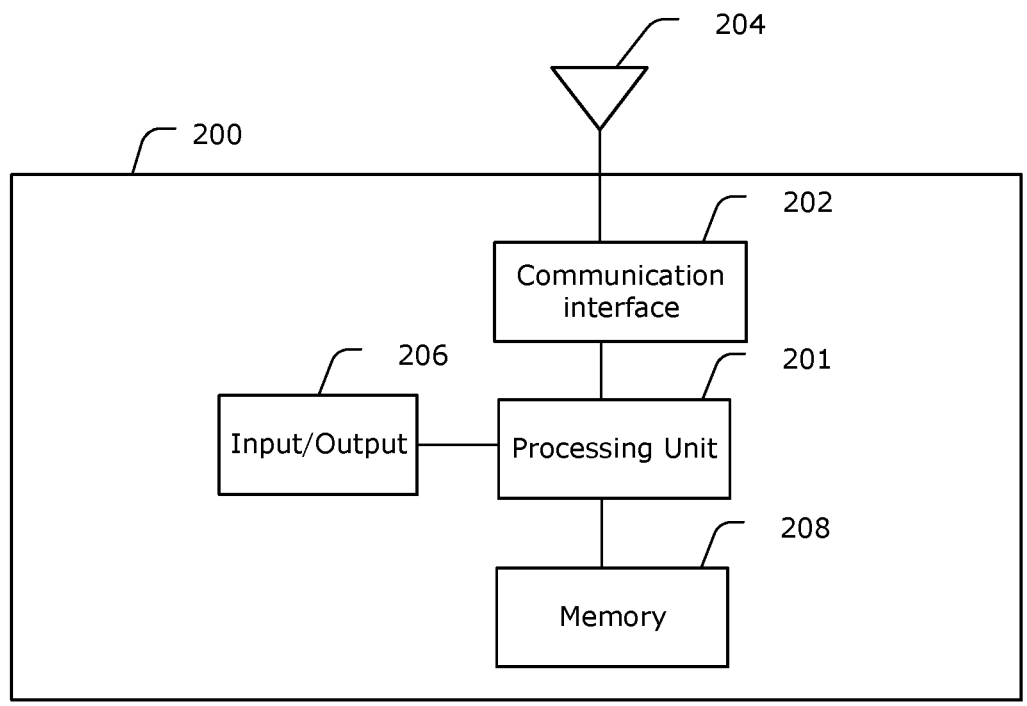
FIG. 2 illustrates an example computing unit that may be used in the system of FIG. 1.
Figure 3:
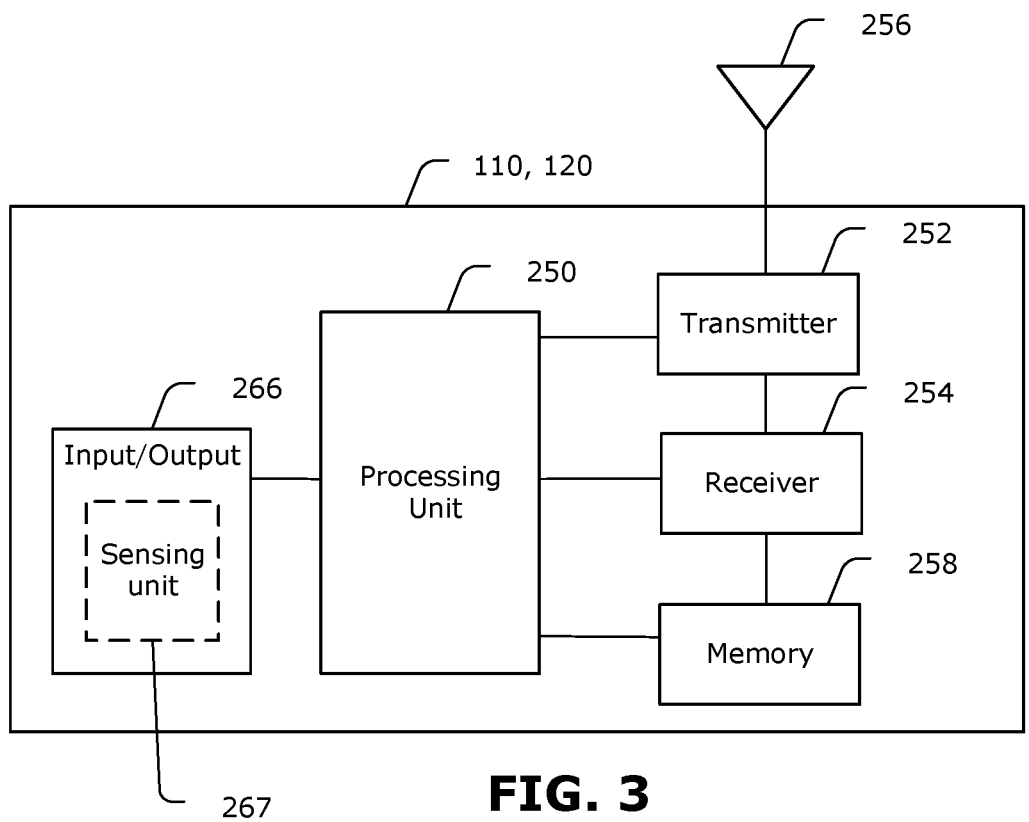
FIG. 3 illustrates an example base station or sensor that may be used in the system of FIG. 1.

FIGS. 2 and 3 illustrate example devices that may implement the methods and teachings according to this disclosure. In particular, FIG. 2 illustrates an example computing unit (e.g., server or data center) 200 that may be used to implement the application 135 and/or scheduler 140 (e.g., in the core network 130); and FIG. 3 illustrates an example BS 120 or sensor 110. These components could be used in the wireless system 100 or in any other suitable system.

As shown in FIG. 2, the computing unit 200 includes at least one processing unit 201. The processing unit 201 implements various processing operations of the computing unit 200. For example, the processing unit 201 could perform signal coding, data processing, power control, input/output processing, or any other functionality of the computing unit 200. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The computing unit 200 also includes at least one communication interface 202 for wired and/or wireless communications. Each communication interface 202 includes any suitable structure for generating signals for wireless or wired transmission and/or processing signals received wirelessly or by wire. The computer unit 200 in this example includes at least one antenna 204. In other examples, the antenna 204 may be omitted (e.g., the computer unit 200 may use only wired communication). Each antenna 204 includes any suitable structure for transmitting and/or receiving wireless signals. One or multiple communication interfaces 202 could be used in the computing unit 200. One or multiple antennas 204 could be used in the computing unit 200. In some examples, one or more antennas 204 may be an antenna array 204, which may be used to perform beamforming and beam steering operations. Although shown as a single functional unit, a computing unit 200 could also be implemented using at least one transmitter interface and at least one separate receiver interface.

The computing unit 200 further includes one or more input/output devices 206 or input/output interfaces (such as a wired interface to the other network(s) 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the computing unit 200 includes at least one memory 208. The memory 208 stores instructions and data used, generated, or collected by the computing unit 200. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the sensor 110 or BS 120 includes at least one processing unit 250, at least one transmitter 252, at least one receiver 254, one or more antennas 256, at least one memory 258, and one or more input/output devices or interfaces 266. The processing unit 250 implements various processing operations of the sensor 110 or BS 120, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the sensor 110 or BS 120. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications. In the case of the sensor 110, the input/output device/interface 266 includes (or is) a sensing unit 267 that monitors and gathers information about an observed subject. For example, the sensing unit 267 may be a camera, a microphone, an infrared sensing unit, or any other such components.

Referring back to FIG. 1, different sensors 110 may obtain information about different aspects of the subject 105. The information transmitted by each sensor 110 may be transmitted using a common information representation scheme or using different schemes. For example, three sensors 110 may be used to observe a crossroad as the subject 105. Information from the sensors 110 may be used by a transportation service provider application, for example. Two sensors 110a, 110b may be video monitors that capture video information of the subject 105 from different angles, and one sensor 110n may be an audio monitor that records surrounding audio information. Visual information from different angles and audio information are all examples of different aspects of the subject 105. All three sensors 110 may encode and transmit the observed or measured information to the BS 120 via wireless connections 115. The two video sensors 110a, 110b may be considered the same type of sensor and may use the same information representation scheme and transmission scheme for extracting information from the subject 105 and transmitting information to the BS 120; and the audio sensor 110n may be considered a different type of sensor and may use a different information representation scheme and transmission scheme, as discussed further below.

In some examples, such transmission of information may take place only when an event of interest occurs (e.g., a car drives by) in the observed subject 105. The BS 120 may receive the information, decode the information, and converge the information as input to the application 135 (which may then make a decision based on the information). In the example where a car is driving by the observed crossroad, if the car is connected to the core network 130 (e.g., as a vehicle-to-everything (V2X) device), the car itself may also provide uplink channel measurement information and may also serve as a type of sensor 110. Thus, information from the car may also be included into the converged information available for the application 135. In an example scenario, an event of interest in the observed subject 105 may trigger a cascade of actions, such as observation, measurement and reporting by the sensors 110, then convergence and decision at the core network 130.

Generally, the transmission of information from a sensor 110 is in accordance with an information representation scheme and a transmission scheme (which may be referred to together as an information representation and transmission scheme, or simply as a scheme). An information representation scheme defines the format (e.g., sampling rates, compression rates, quantization, source encoding) used for the information to be transmitted. A transmission scheme defines the characteristics of the transmission signal (e.g., channel coding, modulation, and waveform). There may be multiple schemes available for use by one sensor 110. For example, multiple schemes may be defined, and may be stored in a local memory (e.g., the memory 258) of the sensor 110. The sensor 110 may use one scheme for a particular transmission, and use another scheme for another transmission. Some sensors 110 may have a degree of autonomy. For example, a sensor 110 may be capable of adjusting or choosing its own information representation scheme and transmission scheme. Some sensors 110 may be more passive. For example, a sensor 110 may rely on the BS 120 and/or other component of the core network 130 to issue commands or messages via wireless downlink channels to adjust or choose the information representation scheme and transmission scheme.

A conventional approach to designing an information representation scheme for a M2M communication may be based on what has been done for enhanced mobile broadband (eMBB) communications. In the eMBB scenario, the information representation scheme was designed separately from the information transmission scheme, with the aim of satisfying human perception. That is, the goal was to enable an average human to recover as much of the source information as possible. In the eMBB scenario, the information representation scheme was built on the assumption that the transmission scheme would establish a one-to-one solid connection between a device and the core network to ensure the completeness, entirety, and low-latency of a block transmission.

In contrast to the eMBB scenario, it may be expected that the majority of the information transmitted the sensors 110 in M2M communications would be targeted to a machine (e.g., the application 135) rather than a human being. Accordingly, the design principles used for developing information representation schemes in eMBB may not be appropriate for M2M communications, especially when the number of sensors 110 increases. The conventional eMBB approach for designing information representation schemes would not be suitable for M2M communications, at least in part due to expected redundancies in M2M communications over the air. Some such redundancies in M2M communications are now discussed.

One type of redundancy may be referred to as inter-sensor redundancy. Although a conventional design approach may result in an optimal information representation and transmission scheme between each individual sensor 110 and the core network 130, the conventional approach does not take into consideration the possibility of redundancy among multiple sensors 110 that observe the same subject 105. For example, in FIG. 1, the information observed and collected by the two video monitor sensors 110a and 110b may capture some common information (e.g., a common background object) about the observed subject 105 even from different visual perspectives. It would be redundant for both sensors 110a, 110b to each transmit the common information. Furthermore, such redundancy may be found even among sensors 110 that capture different types information about the same subject 105. For example, an audio sensor 110n may capture sound features of a car passing through the crossroad, and such audio features may be inferable from the video information collected by the two video monitor sensors 110a, 110b (and vice versa). Accordingly, it would be redundant for the audio sensor 110n to transmit a complete set of audio information. Generally speaking, the more sensors 110 that are deployed to observe a common subject 105, the larger the potential common information among the information collected from all the sensors 110. This potential for inter-sensor redundancy may be true regardless of whether sensors 110 collect information of the same type or not. It is generally desirable to observe, collect, and transmit as much useful (e.g., non-redundant) information as possible about an observed subject 105, using as little wireless resource as possible. Accordingly, it may be more appropriate to design a collective or cooperative information representation and transmission scheme across multiple sensors 110 observing a given subject 105, rather than designing for any individual sensor 110 in isolation. Such an approach is disclosed herein, and may help to reduce the inter-sensor redundancy described above.

Another type of redundancy may be referred to as time-related redundancy. For example, the information collected, represented, and transmitted by one sensor 110 may contain a portion that varies with time and another portion that is substantially time-invariant. In the present disclosure, time-invariant may refer to information that is substantially unchanged for at least a defined duration of time (e.g., for one hour), or that is very slowly changing such that the information is statistically unchanged for the defined duration of time. In other words, the term time-invariant, as used in the present disclosure, may encompass information that is not strictly time-invariant for all time. Conventionally, both time-varying and time-invariant information are transmitted equally, because it is typically hard to distinguish between time-varying and time-invariant information in a given transmission, especially when no prior knowledge about statistic and structural properties of the information source is available. Some attempts have been made to reduce time-related redundancy, for example using compressive sensing technology. However, compressive sensing technology is typically reliant on a good understanding of the characteristics of the information source (e.g., size, dimension, statistic property, structural property, worst case, average case and so on), typically requires a large amount of simulations to validate the compression parameters, and typically requires specific constraints on the format of the information source that must be universality adopted. It is expected that such detailed characterization of information source in M2M communications would likely be unavailable. Further, it is expected that new types and unpredicted types of information source would be introduced. In practical implementation, it is not feasible to customize a set of compressive sensing parameters for every possible information source in the future. As will be discussed further below, the present disclosure provides an approach to information collection and transmission that enables reduction of time-related redundancy, without requiring detailed knowledge about the information source.

Another type of redundancy may be referred to as machine-perception redundancy. In conventional transmission of information, the human sensory system is the typical point of reference. The human sensory system is generally similar for most humans. For example, light signals outside of the visible spectrum are invisible to the human vision system; and audio signals outside of the human hearing range may not be detectable by the human acoustic system. Conventional information representation schemes have been standardized based on the narrow and well-understood range of the human sensing system. In contrast, a machine may not be limited to the range of the human sensing system. Different machines may have different sensing ranges (e.g., driven by different application purposes), even for observing a common subject. This machine differentiation may make it difficult for any universal standardization.

For example, a first application may process image data to count the number of trucks passing the crossroad, and a second application may process image data to detect identification (e.g., license plate number) of each passing vehicle. The second would require a higher image resolution than the first application. The typical simplest way to design a universal information representation and transmission scheme for transmission of information from the sensors is to adopt the most demanding requirement (e.g., highest image resolution required by the second application) across all sensors. However, the result is that there would be machine-perception redundancy for any application that has a lower requirement (e.g., the second application requires only a lower image resolution). In other words, the information that is transmitted to the second application has more information than required by the second application. The result is that the transmitted information does not make the most efficient use of channel capacity and power resources. However, there are difficulties to establishing an information representation and transmission scheme adapted for each application. These difficulties are similar to those encountered when considering time-related redundancy. For example, there may be little or no knowledge about the characteristics of the source information (i.e., a black-box information source) and there may be endless and unpredictable new updates to the observed subject. Moreover, the amount of machine-perception redundancy may be continuously changing. For example, an application may dynamically and automatically change its information needs. For instance, if vehicular traffic on the crossroad increases, the first application may require an increase in the resolution of the image data.

Another type of redundancy may be referred to as importance and quantization redundancy. For example, for a given information source, some observations may be more important or more useful than others. If all observations are treated as equally important, this may result in importance redundancy. Further, the dynamic range of some observations may differ from others. If all observations are compressed or quantized based on the same dynamic range, this may result in quantization redundancy. If there is human involvement, importance and quantization redundancy may be manually tuned (e.g., for image and voice processing, human evaluators may be used to score every optimization in order to arrive at an optimal level of processing). Such manual standardization is very tedious and generally undesirable. Further, this level of standardization likely would not be suitable for M2M communications, because of the different sensing capabilities of machine sensors and the black-box nature of the information source.

The above discussion describes some redundancies that would result from using a conventional approach to designing information representation schemes for M2M communication. The present disclosure provides a solution by taking into account information transmitted by the sensors as a group cooperatively, rather than managing each sensor in isolation. For example, a scheduler in the core network may manage operation of a group sensors that are monitoring a common subject, in order to obtain the desired information about the subject from the group of sensors. The disclosed approach does not require knowledge about the source information, and is not sensor-specific. Further, the disclosed approach enables the information representation and transmission scheme to be adaptable to the observed subject (e.g., can automatically increase resolution when the subject is quickly changing).

Another challenge is how to take into account the physical channel capacity and condition. In conventional compression methods, channel capacity and condition are estimated in a heuristic way, typically using a number of simulations. For example, a conventional approach may start by assuming infinite channel capacity and zero error transmission, and developing several candidate information representation schemes for one information source, optimized by simulations and human evaluators. The candidate schemes may be classified in terms of compression rates (e.g., the lower the compression rate, the poorer the perceived quality by a human), and the minimum channel capacity required for each scheme is determined and specified in a specification. On implementation, either an encoder chooses an information representation scheme (e.g., defining compression, quantization, and source encoding schemes) and then selects the correspondent channel capacity from which a transmission scheme (e.g., defining channel code, modulation, and waveform) is determined; or given an available channel capacity, the encoder chooses a corresponding information representation scheme. This conventional approach aims to satisfy human perception and also efficiently use the granted physical channel capacity. Such an approach may not be suitable for 5G NR and future generation M2M communications, at least because it would be difficult to account for the different characteristics of machine applications and black-box, unpredicted information sources.

In particular, a given information representation scheme is relevant to its transmission scheme, for a given information source and an available channel capacity. The present disclosure describes, in some examples, an autonomous (e.g., machine-learning based) approach to find a suitable information representation scheme (e.g., including compression), for a given black-box information source. The disclosed approach takes into account the channel condition, and is able to adapt to changing channel conditions. The disclosed approach may help to address the above-discussed redundancies, and may apply on a network level for various types of sensors, to help reduce traffic over wireless connections.

Examples described herein provide an encoding method (defined by the information representation scheme) to extract the features of interest from the information collected by the sensors. As will be discussed further below, the extracted features may include information about likelihood distributions, and possibly information about some inherent and latent structure, of the raw information. The features may be extracted from a plurality of raw information sets collected from a plurality of sensors observing a common subject. Coordination among the sensors may be managed at a higher network level (e.g., in the core network). The encoding method is invertible to a corresponding decoding method that recovers the information (e.g., from a number of likelihood distributions). It should be understood that the term "features" in the present disclosure may also encompass "textures". Texture may refer to the arrangement of color and/or intensities (e.g., in grayscale images) in an image but can be extended to any intrinsic structures hidden in information.

Examples described herein also may enable determination of a suitable compression ratio and configuration of sub-channels. For example, for a given physical channel capacity, the optimal information representation scheme (which defines the optimal compression ratio and partition of the features) can be found that reaches the maximum likelihood criteria but with the lowest aggregated physical channel capacity requirements. The amount of features extracted from the raw information may be smaller than the amount of the raw information (i.e., a dimensional reduction). The features may be transmitted over a transmission scheme that defines sub-channels whose configurations are a function of the features. Sub-channelization may be facilitated by the use of features as the basis for transmission (rather than raw information). As will be discussed below, raw information may be encoded as features, which may in turn be divided into different sub-channels for transmission. This approach may help to increase parallelism and may help to reduce latency.

Examples described herein facilitate design of transceivers based on the features transmitted, rather than based on the raw information. For example, for multiple sensors observing a common subject, the transceivers may be designed to identify redundancies and account for such redundancies. In some examples, redundancies may be predicted or inferred (e.g., using machine learning).

Examples described herein enable a high level (e.g., at the core network) scheduler that manages operation of multiple sensors, based on features rather than raw information. For example, based on the status of the observed subject and/or the current channel condition, the core network may schedule different sensors to collect and transmit information.

Figure 4:
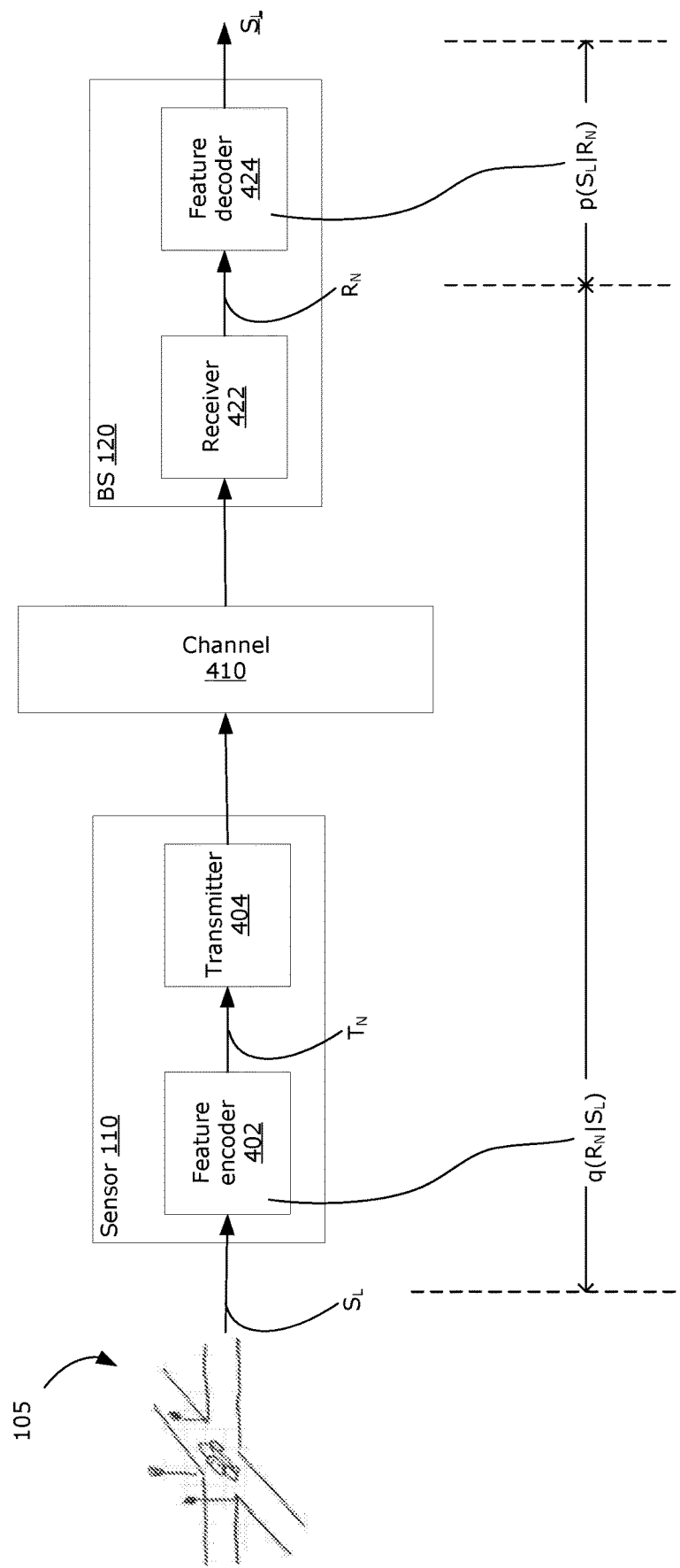
FIG. 4 is a simplified block diagram illustrating an example transceiver chain for one sensor to transmit information to the core network.

Reference is now made to FIG. 4, which is a simplified block diagram illustrating an example transceiver chain for one sensor 110 to transmit information to the core network 130, for example to the BS 120 in the core network 130. Any nodes that may be traversed by the transmitted information from the sensor 110 to the BS 120 may be modeled as part of the channel 410.

In FIG. 4, the sensor 110 obtains information about the observed subject 105. The raw information is in the form of an L-dimensional set $S_L$. The sensor 110 uses a feature encoder 402 to extract N features from the raw information, forming an N-dimensional set of features $T_N$. The feature encoder 402 extracts and encodes the N features in accordance with an information representation scheme. The information representation scheme (which may be defined at the core network 130, such as the BS 120, using a machine-learning approach, as discussed further below) defines parameters such as compression ratio, quantization, and source encoding, among others. The set of features $T_N$ are provided to a physical layer (L1) transmitter 404 of the sensor 110. The transmitter 404 transmits the set of features $T_N$ in accordance with a transmission scheme. The transmission scheme (which may be defined at the core network 130, such as the BS 120, using a machine-learning approach, as discussed further below) defines parameters such as sub-channelization, the modulation and coding scheme (MCS) and signal waveform, among others. The transmission passes through the channel 410, which represents all components between the transmitter 404 of the sensor 110 and a physical layer (L1) receiver 422 of the BS 120. The channel 410 may represent, for example, any intervening nodes, relays, over-the-air channel and environmental factors that may affect the transmission. The channel 410 may be considered to be hostile to the transmission in that the channel 410 is expected to introduce noise to the transmission and also limits the transmission according to the channel capacity limit.

The transmission is received and outputted by the receiver 422 of the BS 120 as an N-dimensional set of received features $R_N$. The set of received features $R_N$ may be noisy, due to the effects of the channel 410. The set of received features $R_N$ is decoded by a feature decoder 424 of the BS 120 to recover an L-dimensional set of recovered information $\underline{S}_L$. It should be noted that the receiver 422 and the transmitter 404 are aligned using the same transmission scheme, such that the receiver 422 knows the sub-channelization, the MCS and waveform used by the transmitter 404 for example. The feature decoder 424 and the feature encoder 402 are also aligned using the same information representation scheme, such that both the encoder 402 and decoder 424 operate based on the same value of N.

Although FIG. 4 shows the receiver 422 and feature decoder 424 as being implemented in the BS 120, in other examples the receiver 422 and feature decoder 424 may be implemented in another component of the core network 130. In other examples, the receiver 422 and feature decoder 424 may be implemented in the BS 120, but the BS 120 may not be part of the core network 130, in which case the BS 120 may transmit the set of recovered information $\underline{S}_L$ to the core network 130 (e.g., to be used by an application 135 (not shown in FIG. 4)). For simplicity, examples will be described in which the receiver 422 and feature decoder 424 are implemented in the BS 120, and the BS 120 is part of the core network 130, but it should be understood that this is not intended to be limiting.

It should be noted that the raw information source is a black box, meaning that neither the sensor 110 nor the BS 120 has any information about the subject 105 or how the raw information is collected by the sensors 110 (e.g., little or no information about organization, format, inherent structures, or sampling noise of the information source).

An approach for designing an information representation scheme, to be implemented at the feature encoder 402, is now described. For M2M communications, particularly in high density deployment, it would be costly to transmit every single piece of raw source information observed by the sensor 110 to the BS 120. The present disclosure describes an approach to design the information representation scheme to reduce (or compress) the amount of information that needs to be wirelessly transmitted. The information representation scheme may help to reduce or avoid at least some of the redundancies discussed previously. The information representation scheme may be thought of as a dimension reduction algorithm at the feature encoder 402, and may include parameters that define sampling, compressing, quantization, feature-extracting (or texture extracting), and/or source encoding. The information representation scheme may be invertible to enable recovering of information at the feature decoder 424.

One approach for designing the feature encoder 402 and feature decoder 424 to be invertible to each other is to consider an approach similar to training of an autoencoder, in which the encoder and decoder are jointly optimized. However, as will be discussed below, the DNNs for implementing the feature encoder 402 and feature decoder 424 cannot be trained exactly like an autoencoder. The reasons for this include the channel which adds noise to the signal, thus making the equation not differentiable and back propagation not possible. Another reason is that the characteristics of the channel and/or the observed subject itself can be always changing, meaning that the conditions are not stable enough.

The feature decoder 424 in the example of FIG. 4 is a probabilistic decoder that aims to recover the set of raw information $\underline{S}_L$, given the set of received features $R_N$. Mathematically, the feature decoder 424 outputs the set of recovered information $\underline{S}_L$ given a set of received features $R_N$, based on the likelihood probability $p(\underline{S}_L|R_N)$, and the received features $R_N$ may be treated as the latent layer. Correspondingly, the feature encoder 402 may implement a probabilistic encoder that encodes the set pf raw information $S_L$ into the set of received features $R_N$. Mathematically, the feature encoder 402 outputs the set of received features $R_N$ based on the likelihood probability $q(R_N|S_L)$. Notably, as indicated in FIG. 4, the likelihood probability $q( )$ represents the likelihood of the received features $R_N$ at the output of the receiver 422, given the raw information $S_L$ at the input of the feature encoder 402. Thus, the likelihood probability $q( )$ encompasses the effects of the transmitter 404 and receiver 422 on the transmission (which can be characterized and known) and also the effects of the channel 410 on the transmission (which may be unknown). Therefore, optimization of the probability encoder for the feature encoder 402 necessarily takes into account the physical channel 410, in particular the Shannon limit of the channel 410. This approach links design of the compression scheme with consideration of the physical channel 410.

Both the probabilistic encoder and the probabilistic decoder should be jointly optimized to maximize the likelihood between $S_L$ and $\underline{S}_L$ and to minimize the mutual information between $S_L$ and $R_N$ for a given subject and channel capacity limit. Optimization may be performed using a machine-learning based approach, with the aim of transmitting as much essential information about the subject as possible and consuming as little physical radio resource as possible.

First, consider the feature decoder 424 that receives an N-dimensional vector $\vec{R}_N$ of soft-values from the receiver 422. It should be noted that, in some of the following mathematical discussions, $R_N$, $S_L$, and $\underline{S}_L$ are denoted as vectors. The mathematical equations may operate on vectors. However, it should be understood that, in general, $R_N$, $S_L$, and $\underline{S}_L$ may be "sets" of information or any other information structure. The receiver 422 may assume the received signals are independent and identically distributed (iid) such that the output $\vec{R}_N$ contains N independent Gaussian distributions. The decoder 424 uses the likelihood probability $p( )$ to decode (or decompress) $\vec{R}_N$ into a vector $\vec{\underline{S}}_L$. $\vec{\underline{S}}_L$ is an L-dimensional signal, each dimension independently following a Gaussian or Bernoulli distribution. It should be noted that $L \neq N$, and typically $L > N$. Mathematically, this can be represented as:

$$\vec{R}_N = \begin{pmatrix} R_0 \\ \ldots \\ R_{N-1} \end{pmatrix}; p(\vec{R}_N) \sim N\left(\vec{\mu}_R, \sum_R\right)$$

-continued $$\vec{S}_L = \begin{pmatrix} S_0 \\ \dots \\ S_{L-1} \end{pmatrix}; p(\vec{S}_L) \sim N\left(\vec{\mu}_S, \sum_S\right)$$

where N( ) is a Gaussian distribution, $\hat{\mu}_R$ is a vector of the expectation value (or mean) of each received feature Gaussian distribution, $\hat{\mu}_S$ is a vector of the expectation value (or mean) of each recovered information Gaussian distribution, and Σ is a covariance matrix.

Figure 5:
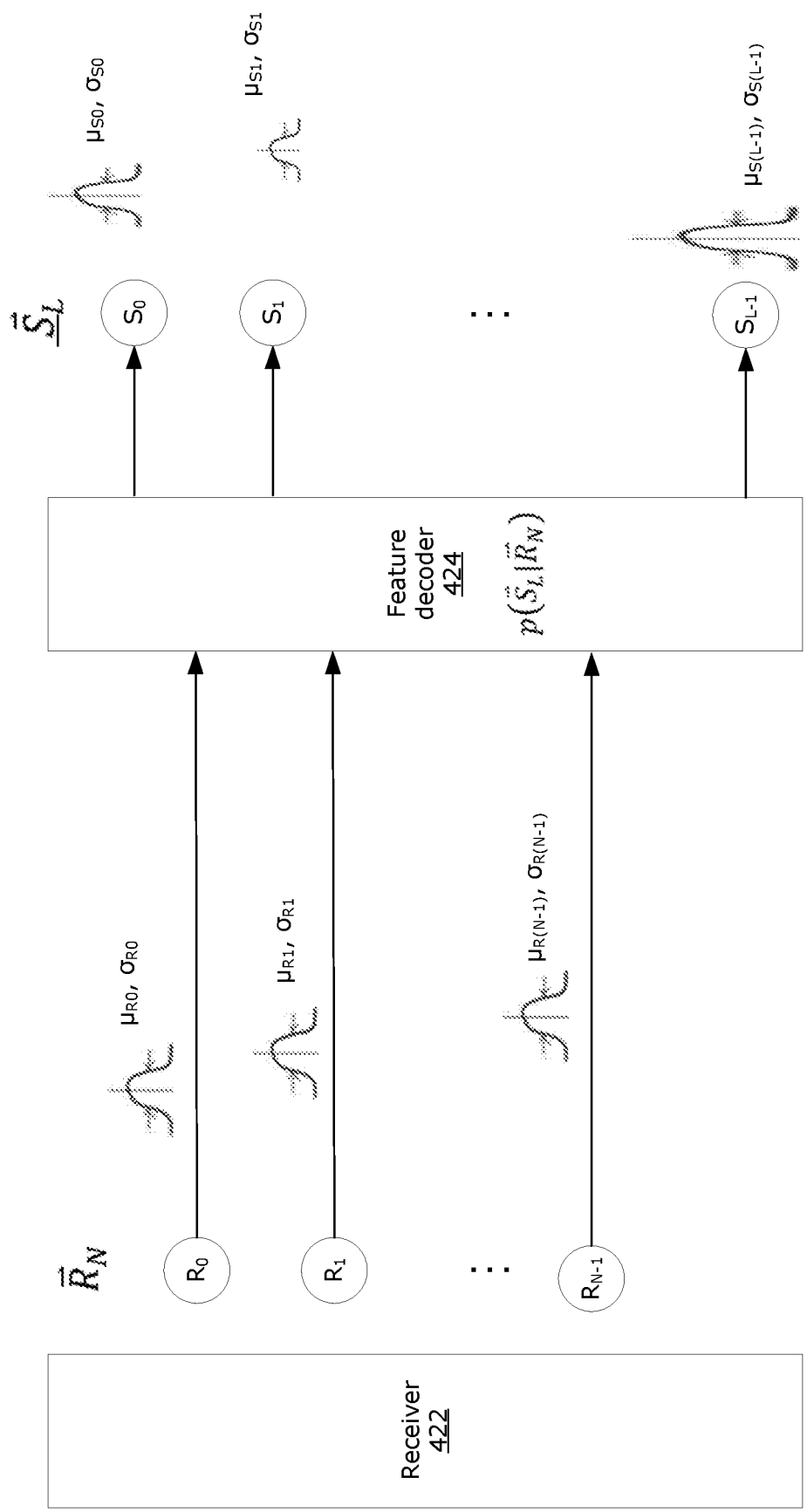
FIG. 5 is a schematic diagram that provides a simplified illustration of a probabilistic decoder that may be implemented at the core network.

FIG. 5 is a schematic diagram that provides a simplified illustration of the probabilistic decoder 424. In this example, we assume that $\vec{S}_L$ also has a Gaussian distribution; however, in other examples $\vec{S}_L$ may have, for example, a Bernoulli distribution. As shown, the receiver 422, having received a transmission via a wireless channel, converts (based a transmission scheme) the received signal into a set of N received features $\vec{R}_N$. Each of the features $R_0$ to $R_{N-1}$ describes a respective probability distribution in terms of expectation value and variance. These values are inputted to the feature decoder 424, which converts $\vec{R}_N$ into a set of L recovered information $\vec{S}_L$. Because in this example $\vec{S}_L$ is assumed to be Gaussian distributed, each of the recovered information $S_0$ to $S_{L-1}$ describes a respective recovered probability distribution in terms of expectation value and variance. It should be noted that L>N, and the probability distributions recovered in $\vec{S}_L$ may be different from the probability distributions of the received features $\vec{R}_N$.

For a given $\vec{R}_N$, the probabilistic decoder outputs $\vec{S}_L$ using $p(\vec{S}_L|\vec{R}_N)$. Mathematically, it is hard to exhaustively find $p(\vec{S}_L|\vec{R}_N)$ in a high dimensional signal space. In examples described herein, a deep neural network (DNN) $p_\phi(\vec{S}_L|\vec{R}_N)$ is used to approximate the true $p(\vec{S}_L|\vec{R}_N)$, where $\phi$ is the set of the neuron weights and thresholds. The architecture of the DNN $p_\phi$ (such as number of layers, connection among the neurons, and threshold functions on each neuron and so on) may be varied for individual implementation. For example, a CNN (convolutional-NN), RNN (recurrent-NN), and/or GNN (Graph-NN) may be used to describe the architecture of the DNN $p_\phi$. A loss/reward function can be designed based on maximum log likelihood, with the input samples $\vec{R}_N$ and output samples $\vec{S}_L$ as follows:

$$\phi^* = \underset{\phi}{\operatorname{argmax}}\left\{E_{\vec{R}_N \sim p(\vec{R}_N), \vec{S}_L \sim p(\vec{S}_L)}[\ln(p_\phi(\vec{S}_L|\vec{R}_N))]\right\}$$

In theory, the DNN training can be done using stochastic gradient descent (SGD) backward propagation. If $p(\vec{S}_L)$ is a Bernoulli distribution, the maximum-log-likelihood becomes a cross-entropy measurement. If $p(\vec{S}_L)$ is a Gaussian distribution, the maximum-log-likelihood becomes a mean square error (MSE) minimization.

However, in practice, this approach is not feasible. $\vec{R}_N$ includes the effect of added noise on $\vec{S}_L$. How much noise is added affects the statistics of $\vec{R}_N$ and the noise is unknown to the DNN $p_\phi(\vec{S}_L|\vec{R}_N)$. Mathematically, the DNN is required to search for a maximum likelihood (ML) optimal solution. It may not be possible for the DNN to fully explore the entire high dimensional space occupied by $\vec{R}_N$.

Similarly, the feature encoder 402 may be implemented using another DNN $q_\theta(\vec{R}_N|\vec{S}_L)$ where θ is the set of the neuron weights and thresholds for a probabilistic encoder. Similarly, to the DNN $p_\phi$ described above, the architecture of the DNN $q_\theta$ (such as number of layers, connection among the neurons, and threshold functions on each neuron and so on) may be varied for individual implementation. For example, CNN, RNN, and/or GNN may be used to describe the architecture of the DNN $q_\theta$. $q_\theta(\vec{S}_L,\vec{R}_N)$ should meet the requirement that the information bottleneck is within the Shannon capacity of the channel. That is, $q_\theta(\vec{S}_L,\vec{R}_N)$ must compress $\vec{S}_L$ into an $\vec{R}_N$ that fits within the channel capacity $C_{limit}$. The information bottleneck may be conceptually thought of as the upper boundary of the mutual information between $\vec{S}_L$ and $\vec{R}_N$. Mathematically, this may be represented as:

$$I(\vec{S}_L, \vec{R}_N) \leq C_{limit}$$

where I( ) is mutual information, and where $C_{limit}$ can be calculated using the Shannon-Hartley theorem as follows:

$$C_{limit} = W\ln\left(1 + \frac{S}{N}\right)$$

where W represents the occupied bandwidth, S represents the signal power, and N represents the channel noise power. The ratio S/N may also be referred to as the signal-to-noise ratio (SNR).

The goal of the training is to make the joint probability $p_\phi(\vec{S}_L,\vec{R}_N)$ and the joint probability $q_\theta(\vec{S}_L,\vec{R}_N)$ as similar to each as possible. The similarity between two probabilities can be indicated by their Kullback-Leibler (KL) divergence as follows:

$$KL(q_\theta(\vec{S}_L, \vec{R}_N) \| p_\phi(\vec{S}_L, \vec{R}_N)) = \int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N$$

The aim of training the DNN is to find ⟨θ*,φ*⟩ that minimizes this KL divergence, where the notation * indicates the weights ⟨θ*,φ*⟩ have been found by this optimization. In particular, the ideal case is KL=0, $q_\theta(\vec{S}_L,\vec{R}_N)=p_\phi(\vec{S}_L,\hat{R}_N))$. The minimization function may be represented as:

$$\langle\theta^*, \phi^*\rangle = \underset{\langle\theta,\phi\rangle}{\operatorname{argmax}}\{KL(q_\theta(\vec{S}_L, \vec{R}_N) \| p_\phi(\vec{S}_L, \vec{R}_N))\}$$

Returning to the previous equation, because:

$q_\theta(\vec{S}_L,\vec{R}_N) = q_\theta(\vec{R}_N|\vec{S}_L) \cdot p(\vec{S}_L)$ therefore a substitution may be made as follows:

$$KL(q_\theta(\vec{S}_L, \vec{R}_N) \| p_\phi(\vec{S}_L, \vec{R}_N)) =$$

$$\int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N =$$

$$\int_{\vec{S}_L} p(\vec{S}_L) \cdot \left(\int_{\vec{R}_N} q_\theta(\vec{R}_N \mid \vec{S}_L) \cdot \ln\left(\frac{q_\theta(\vec{R}_N \mid \vec{S}_L)}{p_\phi(\vec{S}_L, \vec{R}_N)}\right) \cdot d\vec{R}_N + \int_{\vec{R}_N} q_\theta(\vec{R}_N \mid \vec{S}_L) \cdot \ln(p(\vec{S}_L)) \cdot d\vec{R}_N\right) \cdot d\vec{S}_L$$

If a Monte-Carlo method is used on the $\vec{S}_L$ sampling set, this equation becomes:

$$= E_{\vec{S}_L \sim p(\vec{S}_L)}\left[\int_{\vec{R}_N} q_\theta(\vec{R}_N \mid \vec{S}_L) \cdot \ln\left(\frac{q_\theta(\vec{R}_N \mid \vec{S}_L)}{p_\phi(\vec{S}_L, \vec{R}_N)}\right) \cdot d\vec{R}_N + \int_{\vec{R}_N} q_\theta(\vec{R}_N \mid \vec{S}_L) \cdot \ln(p(\vec{S}_L)) \cdot d\vec{R}_N\right]$$

Substituting:
$\int_{\vec{R}_N} q_\theta(\vec{R}_N \mid \vec{S}_L) \cdot \ln(p(\vec{S}_L)) \cdot d\vec{R}_N = \ln(p(\vec{S}_L)) \cdot \int_{\vec{R}_N} q_\theta(\vec{R}_N \mid \vec{S}_L) \cdot d\vec{R}_N = \ln(p(\vec{S}_L))$, the equation becomes:

$$= E_{\vec{S}_L \sim p(\vec{S}_L)}\left[\int_{\vec{R}_N} q_\theta(\vec{R}_N \mid \vec{S}_L) \cdot \ln\left(\frac{q_\theta(\vec{R}_N \mid \vec{S}_L)}{p_\phi(\vec{S}_L, \vec{R}_N)}\right) \cdot d\vec{R}_N + \ln(p(\vec{S}_L))\right] =$$

$$E_{\vec{S}_L \sim p(\vec{S}_L)}\left[\int_{\vec{R}_N} q_\theta(\vec{R}_N \mid \vec{S}_L) \cdot \ln\left(\frac{q_\theta(\vec{R}_N \mid \vec{S}_L)}{p_\phi(\vec{S}_L \mid \vec{R}_N) \cdot p(\vec{R}_N)}\right) \cdot d\vec{R}_N + \ln(p(\vec{S}_L))\right] =$$

$$E_{\vec{S}_L \sim p(\vec{S}_L)}\left[\int_{\vec{R}_N} q_\theta(\vec{R}_N \mid \vec{S}_L) \cdot \ln\left(\frac{q_\theta(\vec{R}_N \mid \vec{S}_L)}{p(\vec{R}_N)}\right) \cdot d\vec{R}_N - \int_{\vec{R}_N} q_\theta(\vec{R}_N \mid \vec{S}_L) \cdot \ln(p_\phi(\vec{S}_L \mid \vec{R}_N)) \cdot d\vec{R}_N + \ln(p(\vec{S}_L))\right]$$

If the Monte-Carlo method is applied on the $\vec{R}_N$ sampling set given a $\vec{S}_L$, the equation becomes:

$$= E_{\vec{S}_L \sim p(\vec{S}_L)}[KL(q_\theta(\vec{R}_N \mid \vec{S}_L) \| p(\vec{R}_N))] - E_{\vec{R}_N \sim q_\theta(\vec{R}_N \mid \vec{S}_L)}[\ln(p_\phi(\vec{S}_L \mid \vec{R}_N))] + \ln(p(\vec{S}_L))]$$

Because $p(\vec{S}_L)$ is an inherent statistic of the raw source information $\vec{S}_L$, this cannot be changed. Thus, the aim of minimizing $KL(q_\theta(\vec{S}_L, \vec{R}_N) p(\vec{S}_L, \hat{R}_N))$ becomes minimizing:

$$E_{\vec{S}_L \sim p(\vec{S}_L)}[KL(q_\theta(\vec{R}_N \mid \vec{S}_L) \| p(\vec{R}_N))] - E_{\vec{S}_L \sim p(\vec{S}_L), \vec{R}_N \sim q_\theta(\vec{R}_N \mid \vec{S}_L)}[\ln(p_\phi(\vec{S}_L \mid \vec{R}_N))]$$

At the end, the joint goal of connecting two DNNs $q_\theta(\vec{R}_N \mid \vec{S}_L)$ and $p_\phi(\vec{S}_L \mid \vec{R}_N)$ may be expressed as:

$$\langle \theta^*, \phi^* \rangle = \underset{\langle \theta, \phi \rangle}{\mathrm{argmin}}\left\{E_{\vec{S}_L \sim p(\vec{S}_L)}[KL(q_\theta(\vec{R}_N \mid \vec{S}_L) \| p(\vec{R}_N))] - E_{\vec{S}_L \sim p(\vec{S}_L), \vec{R}_N \sim q_\theta(\vec{R}_N \mid \vec{S}_L)}[\ln(p_\phi(\vec{S}_L \mid \vec{R}_N))]\right\}$$

Which may be further written as:

$$\langle \theta^*, \phi^* \rangle = \underset{\langle \theta \rangle}{\mathrm{argmin}}\left\{E_{\vec{S}_L \sim p(\vec{S}_L)}[KL(q_\theta(\vec{R}_N \mid \vec{S}_L) \| p(\vec{R}_N))]\right\} + \underset{\langle \phi \rangle}{\mathrm{argmax}}\left\{E_{\vec{S}_L \sim p(\vec{S}_L), \vec{R}_N \sim q_\theta(\vec{R}_N \mid \vec{S}_L)}[\ln(p_\phi(\vec{S}_L \mid \vec{R}_N))]\right\}$$

The second portion of this equation, $$\underset{\langle \phi \rangle}{\mathrm{argmax}}\left\{E_{\vec{S}_L \sim p(\vec{S}_L), \vec{R}_N \sim q_\theta(\vec{R}_N \mid \vec{S}_L)}[\ln(p_\phi(\vec{S}_L \mid \vec{R}_N))]\right\}$$

may be interpreted as a first rule that aims to jointly optimize both the encoder $q_\theta(\vec{R}_N \mid \vec{S}_L)$ and the decoder $p_\phi(\vec{S}_L \mid \vec{R}_N)$ to achieve the output $\vec{S}_L$ that is as similar as possible to the original $\vec{S}_L$. This may be referred to as the maximum likelihood target. The first portion of the equation, $$\underset{\langle \theta \rangle}{\mathrm{argmax}}\left\{E_{\vec{S}_L \sim p(\vec{S}_L)}[KL(q_\theta(\vec{R}_N \mid \vec{S}_L) \| p(\vec{R}_N))]\right\}$$

may be interpreted as a second rule that aims to minimize the occupied channel capacity, and may be referred to as the minimize information bottleneck target, or the upper boundary of mutual information target. The information bottleneck may be expressed as the mutual information between $\vec{S}_L$ and $\vec{R}_N$ from an encoder $q_\theta(\vec{R}_N \mid \vec{S}_L)$ point of view:

$$I(\vec{S}_L, \vec{R}_N) = \int_{\vec{S}_L}\int_{\vec{R}_N} q_\theta(\vec{S}_L, \vec{R}_N) \cdot \ln\left(\frac{q_\theta(\vec{S}_L, \vec{R}_N)}{p_\phi(\vec{S}_L) \cdot p(\vec{R}_N)}\right) \cdot d\vec{R}_N \cdot d\vec{S}_L =$$

$$\int_{\vec{S}_L}\int_{\vec{R}_N} q_\theta(\vec{R}_N \mid \vec{S}_L) \cdot p(\vec{S}_L) \cdot \ln\left(\frac{q_\theta(\vec{R}_N \mid \vec{S}_L)}{p(\vec{R}_N)}\right) \cdot d\vec{R}_N \cdot d\vec{S}_L =$$

$$\int_{\vec{S}_L} p(\vec{S}_L)\left(\int_{\vec{R}_N} q_\theta(\vec{R}_N \mid \vec{S}_L) \cdot \ln\left(\frac{q_\theta(\vec{R}_N \mid \vec{S}_L)}{p(\vec{R}_N)}\right) \cdot d\vec{R}_N\right) \cdot d\vec{S}_L =$$

$$\int_{\vec{S}_L} p(\vec{S}_L)(KL(q_\theta(\vec{R}_N \mid \vec{S}_L) \| p(\vec{R}_N))) \cdot d\vec{S}_L$$

The Monte-Carlo method may be applied to $\vec{S}_L$ samples, to arrive at:

$$I(\vec{S}_L, \vec{R}_N) = E_{\vec{S}_L \sim p(\vec{S}_L)}[KL(q_\theta(\vec{R}_N \mid \vec{S}_L) \| p(\vec{R}_N))]$$

Thus, for a given capacity limitation, the aim is to minimize $I(\vec{S}_L, \vec{R}_N)$.

A discussion of the features that may be encoded for transmission is now presented. A feature that may be transmitted (instead of the raw source information) is a description of a probability (e.g., Gaussian) distribution, such as an expectation value and a variance value (or a standard deviation value). A sensor may quantize the expectation values, and transmit this information using a transmission scheme whose configuration may be based on the variance value—that is, transmission scheme that is used for transmitting the expectation value is a function of the variance value associated with that expectation value. Accordingly, the receiver may use the transmission scheme to determine the variance value associated with the expectation values. The decoder may decode the raw information (e.g., using a decoder DNN) based on the features (e.g., likelihood distributions).

Although the present disclosure describes the probability distributions as Gaussian distributions, it should be understood that this is not intended to be limiting. For example, the probability distributions may be Bernoulli distributions.

The use of expectation and variance values as the transmitted features may be simplified by the use of background knowledge or prior knowledge about the observed subjected. This background or prior knowledge may be considered common information known to both the encoder and decoder. The common information may be aligned between the encoder and the decoder (e.g., via training of DNNs during an initiation phase), such that both the encoder and the decoder know the same common information. The encoder may then rely on the common information being known to the decoder and may need to only encode feature information that differs or builds on the common information.

A probability distribution defines a tolerable range of samples. A slight change in the observed subject may cause a change in the raw information observed by a sensor, but may still fall within the probability distribution. For example, the probability distribution may be common information shared between an encoder and a decoder. If samples x1, x2 and x3 fall within the probability distribution defined by the common information, the encoder may determine that there is no change to the probability distribution and thus no feature needs to be encoded and transmitted. On the other hand, if samples x4 and x5 fall outside of the probability distribution, the encoder encodes these samples for transmission. The encoded features may be an update of the distribution (e.g., a new expectation value and new variance, calculated based on the samples x4 and x5) and the decoder may use this information to update the probability distribution.

Using common information in the manner may enable transmission of information that is more robust (e.g., against a noisy and hostile channel) than transmitting every sample. The Shannon capacity limit theory assumes that two data blocks or even every single bit in one data block, are independently distributed. Therefore, the Shannon capacity limit does not take into account the possibility of structural and/or logical relevance among the information (e.g., correlation of information along the time axis) and among multiple encoders related to the same information source. In examples discussed herein, by selectively transmitting some features and not transmitting others, the channel efficiency would be improved.

So far, the probabilistic encoder $q_\theta(\vec{R}_N|\vec{S}_L)$ accounts for three components: the information representation scheme (used at the feature encoder 402), the transmission scheme (implemented at the transmitter 404 and receiver 422), and the channel 410. If using an existing standard, most existing standards define a limited set of candidate configurations for the transmission scheme. A new L1 transmission scheme cannot be created, but a suitable transmission scheme can be selected from the defined candidate configurations. Although the channel 410 cannot be controlled, a well specified L1 transmission scheme may help mitigate against negative effects (e.g., noise) from the channel 410. For example, the transmission scheme can be used to monitor the status of the channel 410, add sufficient reference signals for the receiver 422 to perform channel estimation, equalize fading and selective factors out, and allocate appropriate configurations such as MCS and waveform to mitigate against the monitored channel conditions.

The effects of the transmitter 404, channel 410, and receiver 422 may be simplified into an operation that adds white noise to the transmitted features, where the added noise level is a function of MCS, power controlling, and waveform.

As $q_\theta(\vec{R}_N|\vec{S}_L)$ generates an N-dimensional $R_N$ sample from N different Gaussian distributions for $p_\phi(\vec{S}_L|\vec{R}_N)$, to form one of the Gaussian distributions $\sim N(\mu_i, \Omega_i)$ at the latent layer $R_N$ (where $\Omega_i$ denotes a value of a variance vector $\sigma$), the feature encoder can transmit the expectation value $\mu_i$ onto one physical channel over which a white noise $\sim N(0, \Omega_i)$ is added, resulting in $N(\mu_i, \Omega_i)=\mu_i+N(0, \Omega_i)$ for $p_\phi(\vec{S}_L|\vec{R}_N)$. The noise level should be consistent with the variance $\Omega_i$. As previously noted, the effective SNR may be controlled by using an appropriate transmission scheme that defines the MCS, transmission power, and waveform. Accordingly, the variance $\Omega_i$ is embodied in the selection of the transmission scheme.

That is, $q_\theta(\vec{R}_N|\vec{S}_L)$ can be divided into a feature encoder DNN for the information representation scheme that maps the L-dimensional set of raw information $S_L$ to the N-dimensional set of features $T_N$, and a number of sub-channels to realize additive noise with the variances for the N-dimensional set of received features $R_N$. Sub-channelization is an efficient method to exploit the physical channel. In sub-channelization, instead of transmitting one information block over one channel, the sensor divides the features over several sub-channels, each of which has a respective transmission scheme.

In many cases, a wireless standard defines a set of candidate physical layer transmission schemes. The $q_\theta(\vec{R}_N|\vec{S}_L)$ and $p_\phi(\vec{S}_L|\vec{R}_N)$ learning architecture trains an encoder DNN to extract the features from the raw information, and to select and configure proper sub-channels to transmit the features. The encoder DNN also separates the features for the sub-channelization and weights the importance of the features for the proper configuration of sub-channels. The learning architecture also trains a decoder DNN to recover the information from the received features.

Figure 6:
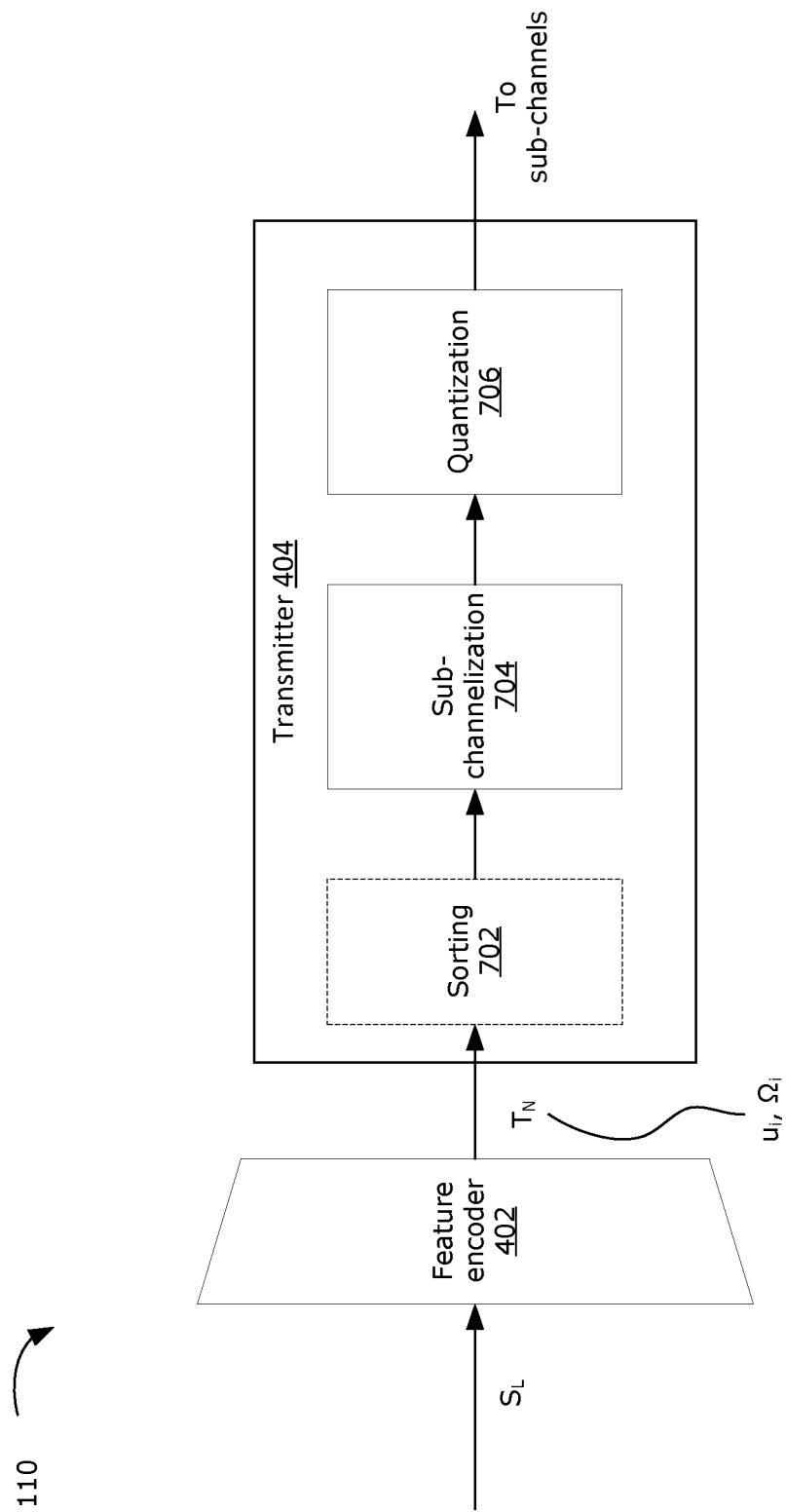
FIG. 6 illustrates an example implementation of a feature encoder and transmitter in a sensor.

FIG. 6 illustrates an example implementation of a feature encoder 402 and transmitter 404 in a sensor 110. The transmitter 404 implements a sub-channelization transmission scheme. The raw information $S_L$ (which can be any format) is sensed by the sensor 110 and input into the feature encoder 402 (which implements the probabilistic encoder $q_\theta$). The feature encoder 402 and outputs the set of N features $T_N$. Because each feature is a Gaussian distribution, each feature can be represented by an information pair comprising an expectation value $\mu_i$ and a variance value $\Omega_i$ (where i is the index of the i-th feature among the N features). Optionally, the transmitter 404 may implement a sorting function 702 that sorts the N features according to their respective the variance values $\Omega_i$, in increasing or decreasing order. It should be noted that the variance value $\Omega_i$ is indicative of the relative importance of the corresponding feature. Generally, a more important feature is one that has a lower variance value. In some examples, two or more features with similar variance values can be merged. For example, if two features $<\mu_i, \Omega_i>$ and $<\mu_j, \Omega_j>$ have different expectation values ($\mu_i \neq \mu_j$) but similar variances ($\Omega_i \approx \Omega_j$), the two features may be merged into the pair $<(\mu_i, \mu_j), \Omega_i>$. Two variance values may be considered to be similar if the two values fall within a predefined range (e.g., within +/−5% of each other). Merging features with similar variance values may enable more channel coding gain.

The transmitter 404 then assigns sub-channels to different features (or merged features) according to the respective variance values, using a sub-channelization function 704. The sub-channelization function 704 assigns those features having smaller variance values (which may correspond to the features that area considered more important) to more robust physical layer sub-channels; and assigns those features having larger variance values (which may correspond to the features that are considered less important) to less robust physical layer sub-channels. This sub-channelization may help to use the physical layer capacity more efficiently. It should be noted that the importance level of features may depend on the application. In some cases, the features with larger variance may be considered to be more important (and hence assigned to more robust sub-channels) because those features contain more uncertainty. The robustness of a sub-channel may depend on the configuration of that sub-channel. For example, a sub-channel may be considered robust if the MCS, waveform and transmission power configured for that sub-channel are generally robust (e.g., less susceptible to noise). Most existing standards (e.g., in 3G, 4G and 5G) include MCS tables that define the correspondence between the range of SNR values (which may be sometimes indicated by block error rate (BLER)) and the MCS (and waveform), therefore the above-described approach may be implemented with existing standards, as well as future standards. In general, the configuration of a sub-channel is related to the variance value of the feature carried in that sub-channel. In particular, the configured MCS for a sub-channel may be selected such that the SNR associated with that MCS matches the variance value of the feature carried in that sub-channel.

The transmitter 404 may generate a control message or header containing information about the configuration of each sub-channel. The control message or header is transmitted after the sub-channels have been configured and may be transmitted as a control message separate from transmission of the feature information (e.g., via a separate control channel) or as a header of the feature transmission. The control message or header provides information to the receiver (e.g., at a receiving BS) for decoding the transmission. As discussed above, the MCS used for a given sub-channel is determined by the instant variance value of the feature assigned to that sub-channel, and the assignment of a feature to a particular sub-channel is also dependent on the instant variance value of that feature. Because the variance values of features can change over time, the assignment of features to sub-channels can change over time (e.g., from one data block to the next) and the MCS used for a sub-channel can also change over time. The control message or header provides information to the receiver about the MCS and sub-channel combination and order, to enable the receiver to properly decode the information carried in the sub-channels. In some examples, this control message or header may be transmitted (e.g., as the header) for each data block. In other examples, the control message or header may be omitted (or simplified) for a data block if the sub-channel configuration and assignment has not changed from a previous data block.

The transmitter 404 performs quantization on the expectation values $\mu_i$ using a quantization function 706. The quantization may be performed according to the optimized transmission scheme (e.g., optimized by machine learning). The quantized values are placed on the respective assigned physical sub-channels having respective configurations dependent on the variance value $\Omega_i$, and transmitted over the sub-channels.

Figure 7:
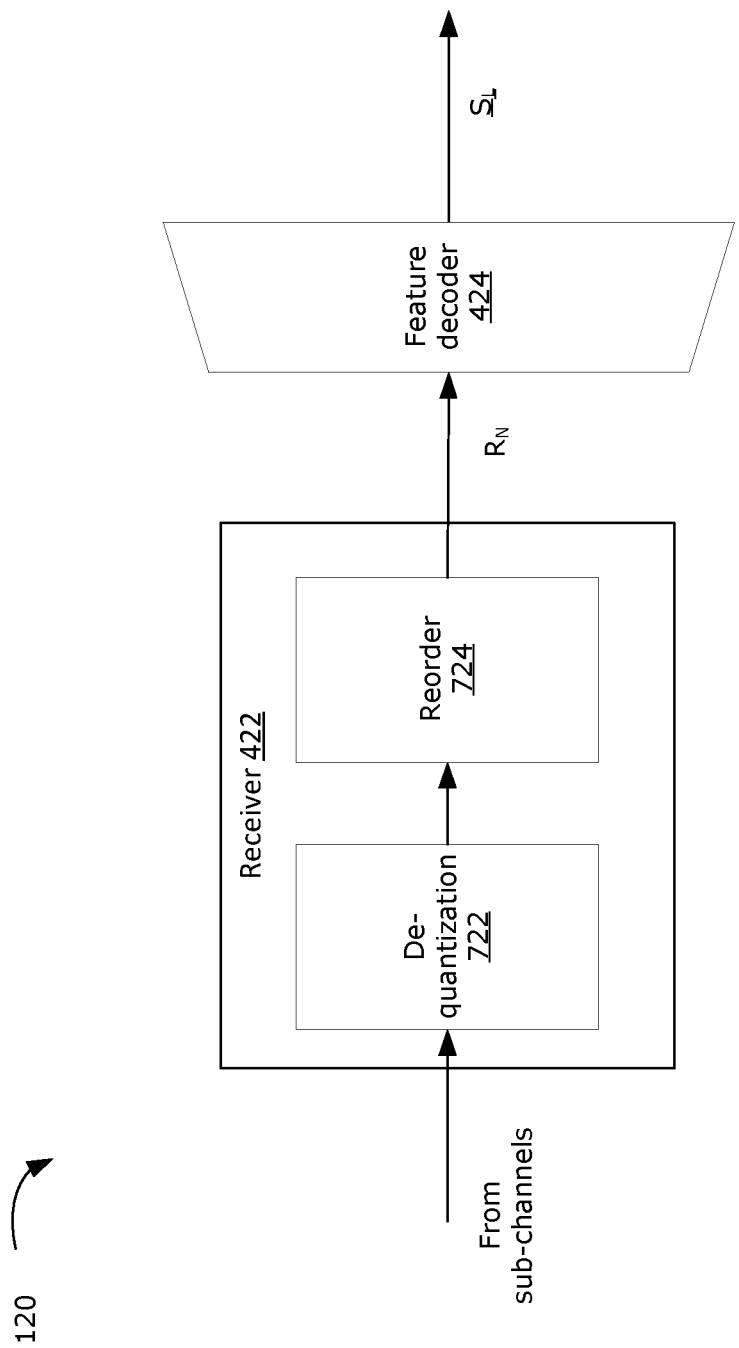
FIG. 7 illustrates an example implementation of a receiver and a feature decoder in a base station.

FIG. 7 illustrates an example implementation of a receiver 422 and a feature decoder 424 in a BS 120. Although shown as being implemented in the BS 120, in other examples the receiver 422 and feature decoder 424 may be implemented in another component of the core network 130, among other possible implementations.

As previously mentioned, the feature order, feature merge (if performed), quantization, and sub-channelization information are encoded into a control message or header and transmitted as a header or as an independent control message. The BS 120 uses this header information to prepare its physical layer receiver 422 to decode these sub-channels properly and to output an N-dimensional latent layer $R_N$ for the feature decoder 424. In the example shown, the receiver 422 uses a de-quantization function 722 to undo the quantization performed at the transmitter 404. The receiver 422 then uses the information from the control message or header to perform a reorder function 724 that reorders the information received in the sub-channels into the appropriate order for $R_N$. The reordered set of received information $R_N$ is then inputted to the feature decoder 424 to be decoded into the set of recovered information $\underline{S}_L$.

It should be noted that the assigning of sub-channels to features may be different for different sensors. For example, one feature of the observed subject may be well detected by a first sensor, but poorly detected by a second sensor. Accordingly, the quality and importance of that feature may differ between the two sensors. The first sensor may thus assign a robust sub-channel for transmission of that feature, but the second sensor may assign a less robust sub-channel for transmission of the same feature. Each sensor may transmit a respective control message or header to the receiver to inform the receiver about placement of the feature on the different sub-channels.

The above description discloses a machine-learning based approach for designing an encoder DNN and decoder DNN, which is able to account for the effects of the channel, and does not require knowledge about the raw information. The encoder and decoder are both probabilistic, meaning that they encode/decode probabilistic distributions rather than any particular sample from the raw information. The information representation scheme and transmission scheme are selected based on features extracted from the raw information, where the features represent probability distributions. For example, the features may represent Gaussian distributions (or Bernoulli distributions). The transmitted features may be quantized expectation values representing the distributions, and the transmission schemes used for transmission of respective features may be L1 configurations corresponding to noise variance values that match the variance values of the respective features.

Both the encoder and decoder DNNs may be trained as a DNN pair, with joint optimization goals. As discussed above, one goal is to maximize the likelihood (which may be considered a kind of entirety and fidelity metric) between the raw information $S_L$ and the recovered information $\underline{S}_L$; and another goal is to minimize the mutual information between the raw information $S_L$ and the received features $R_N$. This joint optimization aims design the encoder and decoder DNNs to use the minimum physical channel capacity to reach the maximum likelihood.

It should be noted that the probabilistic machine-learning based approach disclosed above many enable encoding/ decoding and transmission of any raw information, without requiring prior knowledge about the raw information. It is not necessary to know the format and organization of the raw information, for example. Rather, raw information may be used as training samples for training the encoder and decoder DNNs and for configuring the physical layer subchannels.

An example method for training the encoder and decoder DNNs is now described in greater detail. Consider an example M2M scenario in which a service provider would like to monitor a subject (e.g., a crossroad). A plurality of sensors are placed to observe the subject, with wireless connections to the core network (which may host an application of the service provider). A certain channel capacity is available (e.g., purchased by the service provider) for this service. No information about the format or data organization or inherent structure of the raw information is available to the wireless network. It should be pointed out that, if any such information is available, then such prior information may be used to help configure the DNNs' architectures. For example, if some inherent structures of the source information of the subject are known a priori, the architecture of the DNN, for example the graph topology of a GNN, may be designed for training and/or simplification purposes. In general, although the present disclosure describes examples with reference to DNNs, any suitable neural network architecture may be used. For example, a GNN may a useful architecture for extracting features (or textures), because such a neural network may benefit from some a priori knowledge about the structure of the raw information. For example, an RNN may also be a useful architecture for extracting features (or textures), because it may benefit from time correlation in the structure of the raw information.

Figure 8:
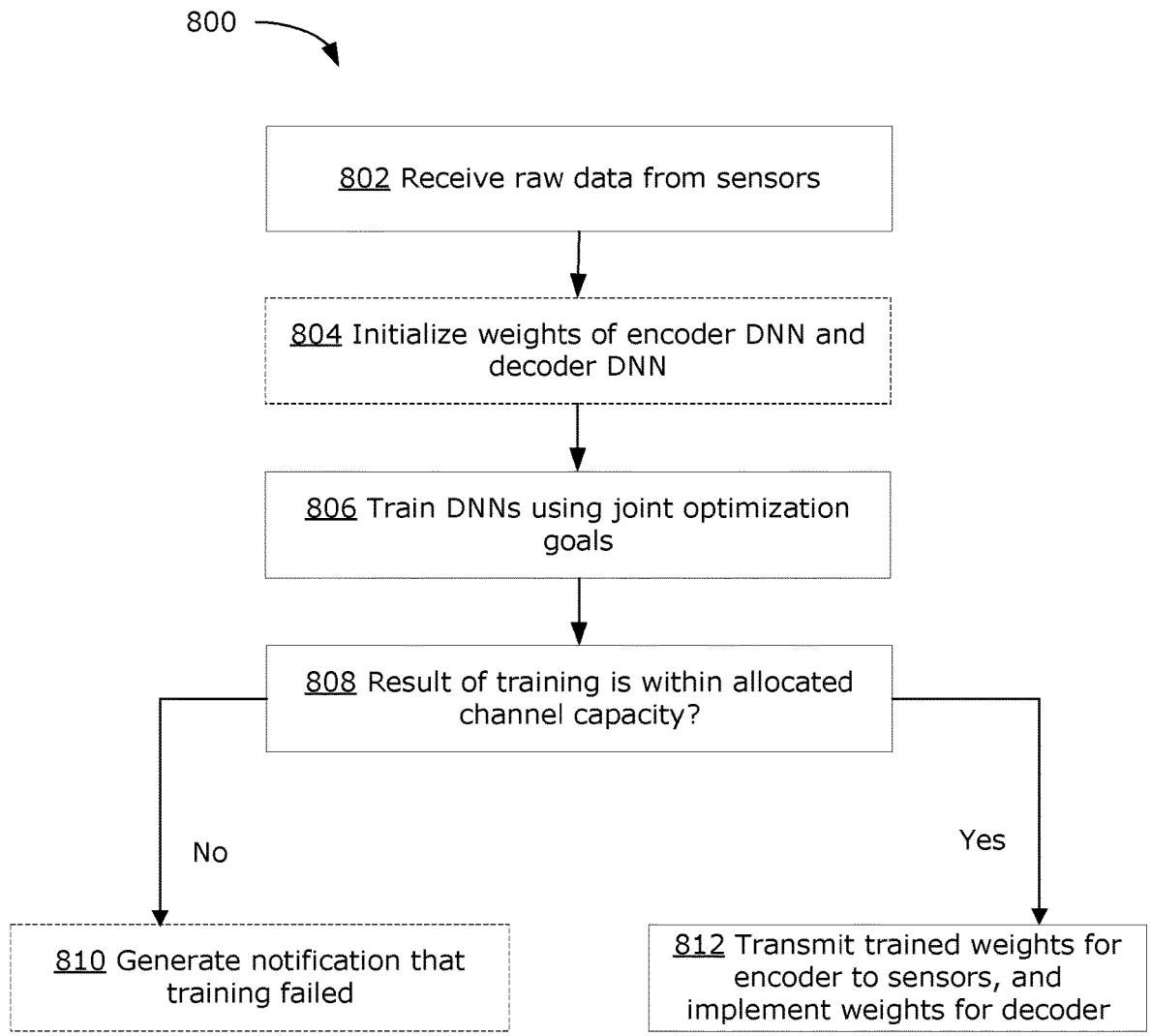
FIG. 8 shows a flowchart illustrating an example method for training an encoder and decoder DNN pair.

FIG. 8 shows a flowchart illustrating an example method 800 for training and implementation of the DNNs. The method 800 may be implemented at a network entity that receives information from a plurality of sensors observing a common subject. In the context of FIG. 1, the method 800 may be implemented at the core network 130, for example at the BS 120 that is in communication with the sensors 110 observing the same subject 105. It should be noted that, in this example, training of the DNNs is performed on a per-subject basis. The architecture of DNNs may be chosen on a per-subject basis as well. If there is significant statistical change in the observed subject 105, the training may need to be repeated in order to update the weights of the DNNs. The method 800 may take place during an initiation phase. As discussed above, training of the DNNs aims to satisfy two targets: to maximize likelihood between the source information and the recovered information (i.e., achieve ML target); and to minimize the information bottleneck to save the physical resource (i.e., achieve KL target). The two targets may be thought of as being in opposition to each other because in order to achieve the ML target, it is best to transmit as much information as possible, which opposes the KL target. The training is designed to automatically find the equilibrium among these two adversary targets.

At 802, the BS 120 receives raw information that has been collected and transmitted by each sensor 110 about the observed subject 105. If the training takes place in another component of the core network 130 or outside of the core network 130 (e.g., at a remote data center 160), the BS 120 may further transmit the raw information to the appropriate entity. For simplicity, the present discussion will refer to the example where the training is performed at the BS 120. However, it should be understood that this is not intended to be limiting, and steps of the method 800 may be performed elsewhere in the network (e.g., at another component of the core network 130 or other network entity).

The raw information may be stored as training samples, for example in a local memory or remote database (e.g., at the remote data center 160) accessible by the BS 120. Training of the encoder and decoder DNNs may be done for one type of sensor at a time (e.g., sensors gathering visual information, or sensors gathering audio information), in which case the raw information may be collected only from one type of sensor 110 connected with the BS 120. For example, the BS 120 may assign a sensor type to each connected sensor 110 (or each sensor 110 may declare its own type) and may request raw information from one type of sensor at a time. Alternatively, the BS 120 may receive raw information from all sensors 110 regardless of type, and the BS 120 may organize the raw information into separate sets of training samples according to sensor type.

A physical capacity $C_{limit}$ has been allocated for transmission of information about the subject 105. For example, the scheduler 140 in the core network 130 may allocate the channel capacity (e.g., based on request by the service provider). As will be discussed further below, it is possible that the allocated physical capacity may not be sufficient to accommodate the transmission of features.

The number of features to be transmitted is N. N may be predetermined. Optionally, N may be determined as part of training. Details of how to determine N will be discussed further below with respect to FIG. 9.

Optionally, at 804, initialization is performed. Initialization may include initialization of the architecture (if some prior knowledge about the raw information of the subject is available), the weights θ (also referred to as coefficients, weighting coefficients, or neurons) in the encoder DNN $q_\theta(\vec{R}_N|\vec{S}_L)$, and the weights φ in the decoder DNN $p_\phi(\vec{S}_L|\vec{R}_N)$. The weights θ and φ may be randomly initialized or may be initialized based on some experience/historical values. Based on the determined (or predetermined) N, $C_{limit}$ is shared equally by N sub-channels, such that the capacity of each sub-channel is initially $C_{limit}/N$, which is translated into a noise variance $\sigma_{ch}$. In some examples, such as where the method 800 is being performed to retrain previously trained encoder and decoder DNNs, initialization may not be required and 804 may be omitted. For example, the previously trained DNN weights may be used as the starting point of the training.

At 806, the DNNs are trained, with the training samples from the raw information (received at 802), using the joint optimization goals discussed above. The training may take place iteratively, where the training samples are provided batch by batch.

Training on one batch of training samples is now described. The sample are input into the probabilistic encoder DNN $q_\theta(\vec{R}_N|\vec{S}_L)$, which outputs N Gaussian distributions as the features $T_N$. Each feature contains an expectation value $\mu_i$ and a variance value $\Omega_i$. The variance value $\Omega_i$ scales a normal distribution N(0,1) into N(0, $\Omega_i$) that is in turn added onto the expectation value $\mu_i$. Together, the features are used to form an N-dimensional latent layer $R_N \sim N(\mu_i, \Omega_i)$. The encoder DNN $q_\theta(\vec{R}_N|\vec{S}_L)$ is trained (e.g., using backward propagation) to minimize the mutual information between the raw information $S_L$ and the received features $R_N$. Specifically, the training aims to minimize the KL divergence (which is indicative of mutual information) between $R_N$ and $N(\mu_{cl}, \sigma_{cl})$, where $N(\mu_{cl}, \sigma_{cl})$ is the target distribution for the latent layer $R_N$. The subscript cl indicates the sub-channels that have been divided among the N features. As previously described, during training it is assumed that the sub-channels are equally allocated among the N features, thus $\sigma_{cl}$ represents $C_{limit}/N$. During the training, the aim is for $R_N$ to be as similar to these $N(\mu_{cl}, \sigma_{cl})$ distributions as possible. This setup allows the KL value to be differentiable with respective to $\theta$ from $R_N$ back to $S_L$.

The N-dimensional latent layer $R_N$ is provided as input into the decoder DNN $p_\phi(\vec{S}_L | \vec{R}_N)$ to generate $\underline{S}_L$. The decoder DNN $p_\phi(\vec{S}_L | \vec{R}_N)$ is trained (e.g., using backward propagation) to maximize log likelihood between $S_L$ and $\underline{S}_L$. This setup allows the ML value to be differentiable with respective to $\phi$ from $\underline{S}_L$ back to $R_N$.

Training is performed until the ML value satisfies a training criteria (e.g., reaches a threshold value indicating that $S_L$ and $\underline{S}_L$ are very similar to each other, which may be considered a fidelity metric). The method 800 then proceeds to 808.

At 808, a check is performed to determine whether the result of training is within the allocated channel capacity $C_{limit}$. Specifically, the trained KL value is compared against the allocated $C_{limit}$. If the training cannot converge, it is likely due to the allocated channel capacity $C_{limit}$ being insufficient for the observed subject and/or the ML criteria is too high. It should be understood that training of the DNNs is performed to meet both the ML training criteria and the KL criteria equally and together.

At 810, if the training fails (e.g., does not converge), optionally a notification may be generated indicating that training failed. The notification may inform the service provider to either purchase more physical capacity or reduce the resolution of the raw information, for example.

At 812, if the training is successful (e.g., converges and reaches the optimization targets) the trained weights $\theta$ and $\phi$ for both the encoder and the decoder may be stored. The weights $\theta$ for the encoder are also transmitted to the sensors 110, to enable the sensors 110 to implement the encoder DNN. The weights $\phi$ for the decoder are used to implement the decoder DNN (e.g., at the BS 120). The training also allocates sub-channel capacity, such that the sub-channels may have with different capacity and noise.

As previously noted, the encoder and decoder DNNs may be trained on the raw samples from one type of sensor at a time. Accordingly, sensors 110 of the same type may implement the same encoder DNN, and the BS 120 may implement different decoder DNNs for decoding information from different types of sensors 110. Steps of the method 800 discussed above may be repeated as necessary to train different DNNs for different types of sensors. The initiation phase may end when all encoder and decoder DNN pairs for all sensors 110 connected to the BS 120 have been trained. The training results (including design of the architecture if applicable, and coefficients), may be transmitted by the BS to the sensors via downlink channels, so that the sensors could configure their own encoders accordingly.

The above example provides a trainable mechanism for both the encoder and decoder DNNs. Notably, the effects of the channel is reduced into a transmission of the expectation value with a scaled normal distribution of noise, which is differentiable in the back propagation.

As mentioned above, in some examples the number of features N may be predefined. In other examples it may be necessary to determine N as part of DNN training. N is a parameter that indicates the compression ratio (which may also be referenced in terms of the dimension reduction ratio L:N that reduces the L-dimensional raw information to the N-dimensional features). Different Ns would result in different encoder DNN $q_\theta(\vec{R}_N | \vec{S}_L)$ and decoder DNN $p_\phi(\vec{S}_L | \vec{R}_N)$. Accordingly, appropriate determination of N may be an important part of training the encoder and decoder DNNs.

Figure 9:
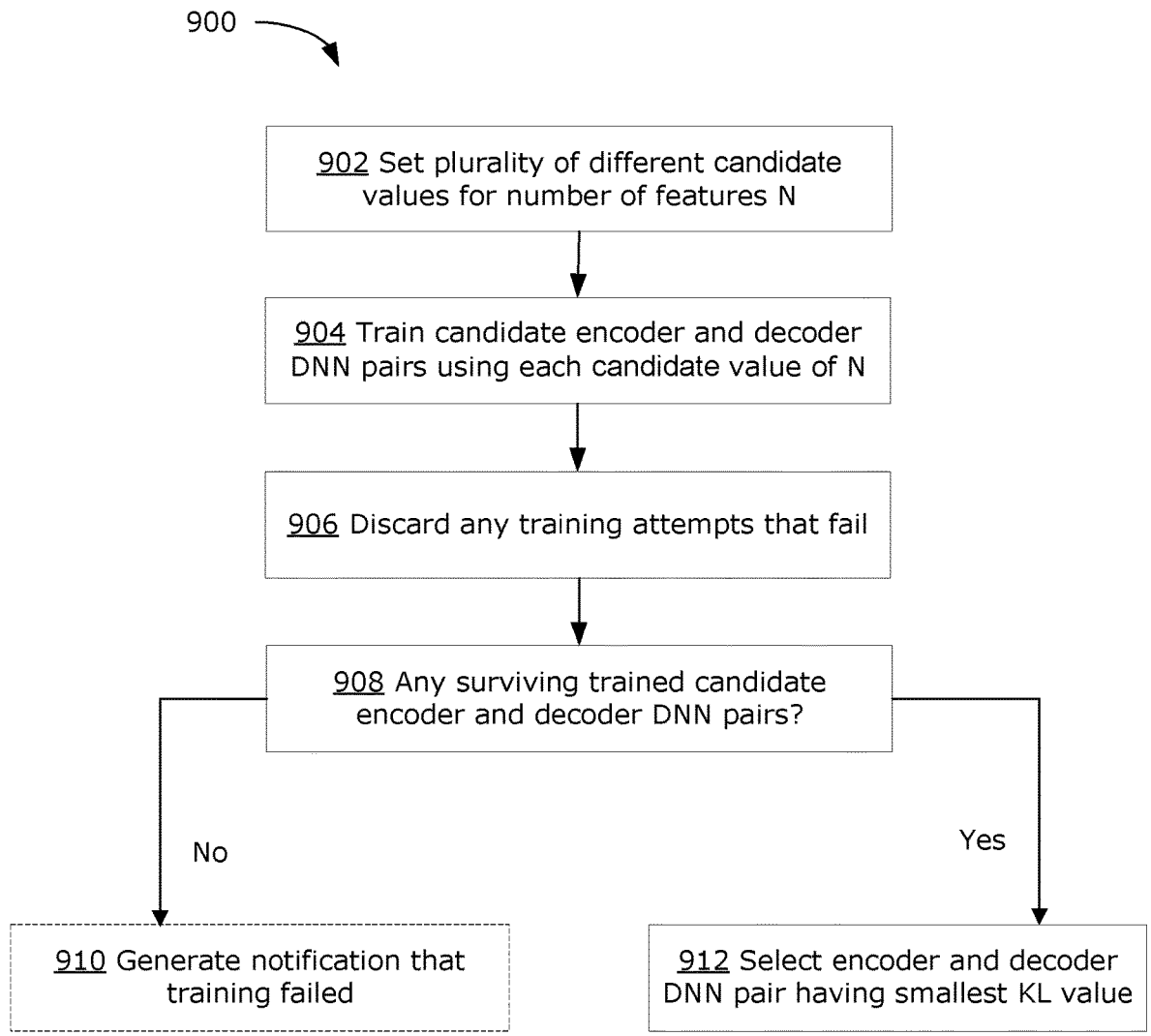
FIG. 9 is a flowchart illustrating an example method 900 for determining an optimal number of features for an encoder and decoder DNN pair.

FIG. 9 is a flowchart illustrating an example method 900 for determining the number of features N. The method 900 may be implemented as part of or together with the method 800 during the initiation phase. Similarly to the method 800, the method 900 may be implemented at the core network 130, such as at the BS 120 that is in communication with the sensors 110 observing the same subject 105. For simplicity, the method 900 will be discussed using the non-limiting example of implementation at the BS 120.

At 902, in absence (or limited information) of any prior knowledge about the raw information, the BS 120 sets a plurality of different candidate values for N, for performing training in parallel. The different candidate values for N may be set to reflect a range of compression ratios, from more compressive to less compressive. For example, the BS 120 may select a range of candidate values ranging from a compression ratio of 0.2 to 0.8, among other possibilities.

At 904, each candidate value of N is used to independently train a respective candidate encoder and decoder DNN pair. Each candidate DNN pair provides a respective compression ratio (depending on the associated candidate value of N). For example, the training may be performed using steps 804-808 discussed above. The training of each candidate DNN pair is performed using the same training samples.

At 906, any training attempts that fail (e.g., training does not converge on KL and/or ML targets are discarded. In particular, any candidate values of N associated with the failed training attempts are discarded.

At 908, it is determined whether there is any surviving trained candidate encoder and decoder DNN pair that is successful (i.e., satisfies joint optimization goals, and within allocated channel capacity).

At 910, if there are no survivors, optionally a notification may be generated indicating that training failed. Having no survivors may indicate that the allocated channel capacity is too low and/or the ML criteria is too high. Accordingly, the notification may optionally inform the service provider to either purchase more physical capacity or reduce the resolution of the raw information, for example.

At 912, if the training is successful for at least one candidate encoder and decoder DNN pair, the candidate encoder and decoder DNN pair having the smallest KL value is selected as the encoder and decoder DNN pair for implementation. The N value associated with the selected encoder and decoder DNN pair is the N value resulting in the optimal compression ratio L:N. This N value is selected for implementing the DNNs, and is the N value that enables minimum physical capacity and also meets the ML criteria. In the special case where there is only one candidate encoder and decoder DNN pair that is successfully trained, that one DNN pair (and its associated N value) may be selected without considering the KL value.

The trained weights $\theta$ and $\phi$ for the selected encoder and decoder DNNs may be stored and/or transmitted, using step 812 described above.

After the encoder and decoder DNNs have been trained and the weights implemented at the sensors 110 and BS 120, the monitoring phase may begin. During the monitoring phase, each sensor 110 collects raw information and uses the trained encoder DNN to extract and encode features or textures (e.g., expectation and variance values representing probability distributions), and transmit to the BS 120 over sub-channels. The BS 120 uses the trained decoder DNN to decode and recover the information. The recovered information may then be further processed (e.g., inputted to another application to make a machine-based decision). In some cases in which the further processing is done by a machine, the received features $R_N$, which represent distributions, may be directly sent to that machine (which may be interested in certain features and/or certain combinations of the features).

The training may be repeated, for example when there is a significant change in the observed subject, significant change in the sensors and/or significant change in the information required by the applications at the core network. For example, retraining may be triggered by the DNN itself and/or by an application that detects a degradation in the recovered information. Degradation may be detected as, for example, insufficiency of information for the application to perform a task (e.g., unable to clearly detect license plates of vehicles passing a monitored crossroad). Generally, the need for retraining may be caused by, for example, changes in the surrounding environment (e.g., darkening of ambient light, sudden increase in vehicles/pedestrians/etc.), changes in the channel (e.g., increase in wireless devices entering the area resulting in reduction in available channel capacity), and/or changes in the sensors (e.g., significant increase/decrease in number of sensors monitoring a given subject, or significant increase/decrease in sensor capability—such as due to damage, loss of power, or system upgrades), among other possibilities. The application may communicate a request for retraining to the BS.

The DNN may also itself detect a degradation and may cause the BS to internally trigger retraining. The BS may send commands into the control or data downlink channels to the sensors, to cause the sensors to start collecting and transmitting the raw information, as the start of the retraining process. In some examples, retraining may be triggered by one or more sensors that observe some degradation in the transmitted features. A sensor may detect degradation in the collected information by detecting unexpected changes in the features extracted from the information. Typically, a sensor would expect features to change gradually (e.g., within an expected range and/or within an expected rate of change). If the sensor detects unexpected changes in the features, such as over a short period the features change outside of the expect scope, features that are expected to be time-invariant becomes highly time-varying, or features are changing rapidly or randomly, this may be indicative of degradation in the collected information. Such degradation may be the result of a dramatic change in the observed subject (for example, a car accident blocking the observed crossroad), or error in the sensor itself (e.g., sensor malfunction or deliberate tampering of the sensor). In response to detection of such degradation, the sensor(s) may send a request for retraining to the network, or the sensor(s) may stop encoding the information and start to send the raw information, to initiate the retraining process.

In some examples, retraining may be done periodically. For example, sensors and the BS may have an established schedule for the sensors to send the raw information to the BS. The sensors may be scheduled in rotation for transmitting raw information, so that the channel is not overwhelmed. The raw information may be received and stored by the BS for the retraining purpose. Retraining may be done periodically, using the received and stored raw information, and initialization of coefficients may be using the current coefficients rather than random values, in order to track the changing subject. After retraining, the BS may decide whether, when, and how to inform the sensors to update the encoder DNNs (e.g., through DL control or data channels).

Having described example methods for training the encoder and decoder DNNs, example methods to reduce redundancies are now discussed.

As previously discussed, one type of redundancy is time-related redundancy. Time-related redundancy arises when one or more features are substantially time-invariant (for at least a certain time period). It becomes redundant to transmit information about such time-invariant features (for at least the time period). To address this type of redundancy, both a sensor and the BS may use a database (also referred to as an experience history library) to store historical information about the features transmitted/received between the sensor and the BS.

Figure 10A:
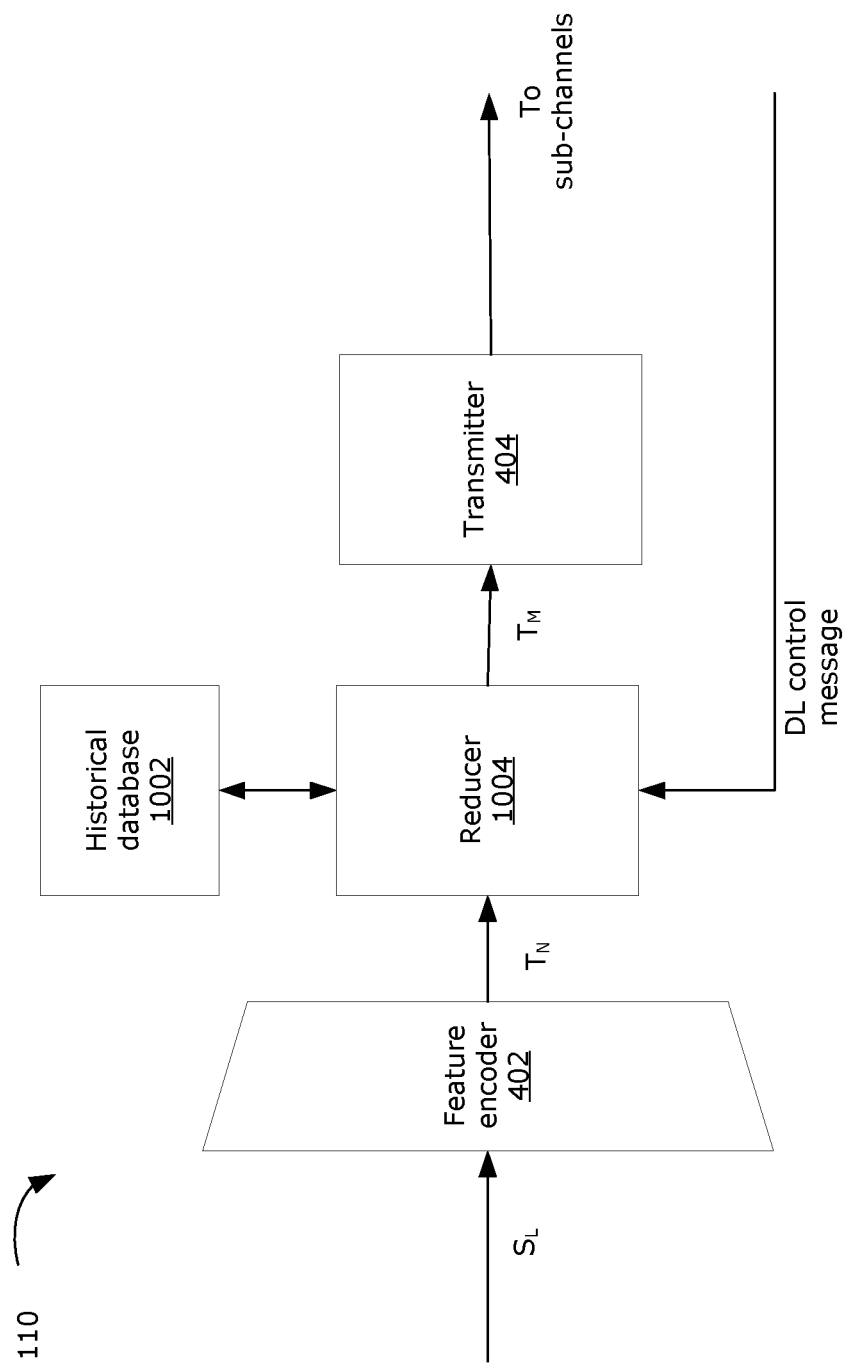
FIGS. 10A and 10B are schematic diagrams that show an example sensor and an example base station, respectively, that implement methods for reducing redundancy.
Figure 10B:
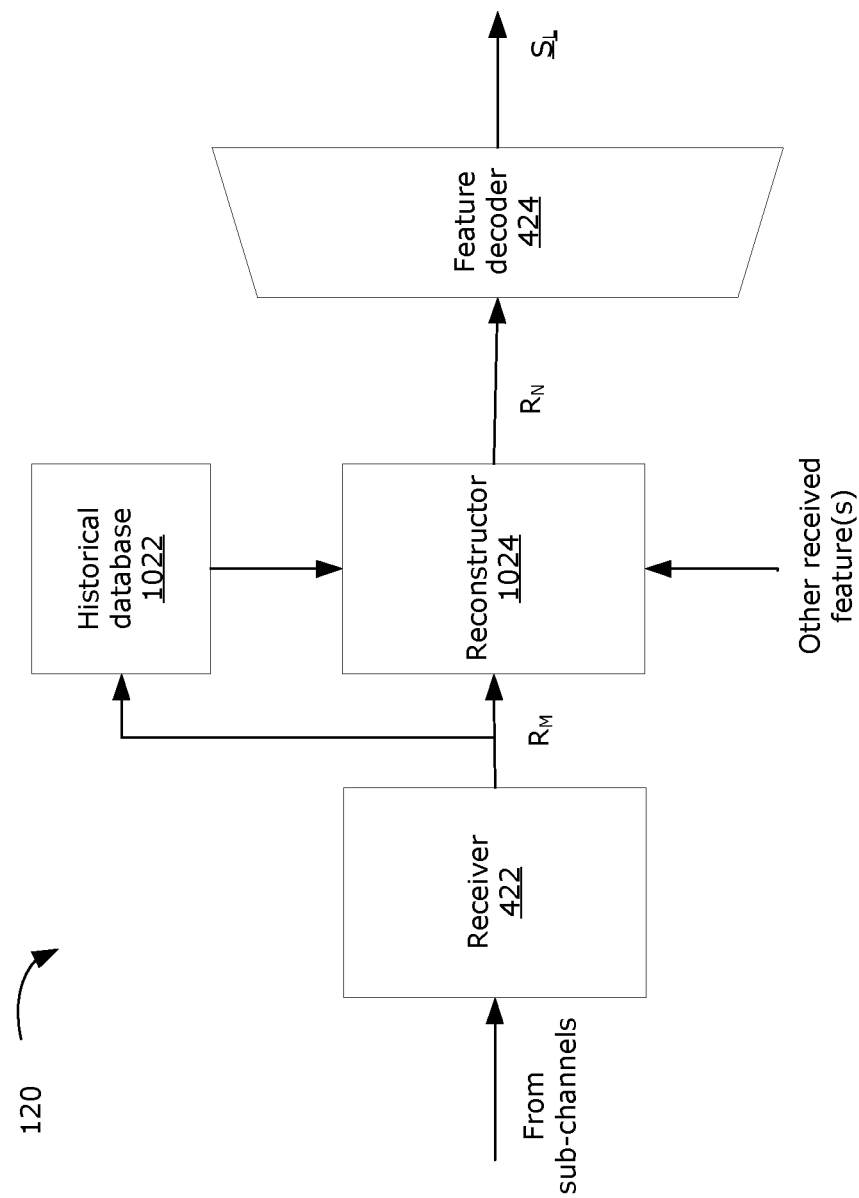

FIGS. 10A and 10B are schematic diagrams that show an example sensor 110 and an example BS 120, respectively, that implement methods for reducing redundancy. It should be understood that the sensor 110 and BS 120 of FIGS. 10A and 10B may be a modification of the sensor 110 and BS 120 of FIGS. 6 and 7, discussed above. For example, the details of the transmitter 404 and receiver 422 discussed above with respect to FIGS. 6 and 7 may be implemented in the transmitter 404 and receiver 422 shown in FIGS. 10A and 10B.

The sensor 110 and the BS 120 may each maintain a respective historical database 1002, 1022 containing historical information about features. For simplicity, the historical databases 1002, 1022 will be discussed together. However, it should be understood that there may be differences between the historical database 1002 maintained by the sensor 110 and the historical database 1022 maintained by the BS 120. For example, there may be differences in the database structure, in how stored information is formatted and accessed, and there may be differences in how the stored information is updated (e.g., the timestamp of the stored information in the historical database 1022 of the BS 120 may be later than the timestamp of the corresponding stored information in the historical database 1002 of the sensor 110, due to transmission latency).

The historical database 1002, 1022 may store the most recently updated expectation value and variance value for each feature. Optionally, a timestamp may be used indicate the time of the last update to the stored information.

In operation, the sensor 110 extracts a set of N features $T_N$ from the collected information $S_L$, using the feature encoder 402 (which implements the trained encoder DNN). The sensor 110 uses a reducer 1004 that attempts to reduce the set of N features $T_N$ to a set of M features $T_M$. Although FIG. 10A shows the historical database 1002 and the reducer 1004 as separate components, in some examples the historical database 1002 and/or the reducer 1004 may be implemented together and/or as part of the transmitter 404.

The reducer 1004 compares the set of N features $T_N$ against the stored information in the historical database 1002. If a feature in the set of features $T_N$ is substantially unchanged (e.g., within a tolerance threshold, such as within +/−5%) from the stored value, then that feature does not need to be transmitted. The reducer 1004 may encode a non-transmission flag into a header or control message for the receiver, to indicate the particular feature that has been removed from transmission. The header or control message may be transmitted together with or separately from the transmission of information. In some examples, the non-transmission flag may be included in the control message or header that provides sub-channelization information as discussed above. The reducer 1004 may further update the historical database 1002 with any updated features and also updates the timestamp (if used). As a result, the set of features $T_N$ is reduced to a reduced set of features $T_M$. The reduced set of features $T_M$ may then be placed on sub-channels and transmitted by the transmitter 404, as discussed above. In some examples, there may not be any reduction of features (e.g., all features may have updates compared to the historical information). In other words, generally $M \leq N$.

In further embodiments, the historical databases 1002 and/or 1022 may be supplemented or replaced by a predictor to provide information to the reducer 1004 to reduce the set of transmitted features. For example, the information provided by the predictor may be decisions about which specific features are to be transmitted or not transmitted. In some examples, the predictor may be implemented by a DNN that is trained by one or both of the historical databases 1002 and 1022 (e.g., by reinforcement learning that uses the information in the historical database as experience).

At the BS 120, the header or control message is used to identify which features were not transmitted. The receiver 422 receives the transmission and, using the transmission scheme, converts it to the set of M received features $R_M$. The features $R_M$ are used to update the information stored in the historical database 1022. If a timestamp is used, the timestamp may be updated. The BS 120 uses a reconstructor 1024 to fill any non-transmitted features, into the set of N received features $R_N$. Although FIG. 10B shows the historical database 1022 and the reconstructor 1024 as separate components, in some examples the historical database 1022 and/or the reconstructor 1024 may be implemented together and/or as part of the receiver 422.

For example, the reconstructor 1024 may use information from the header or control message to identify the non-transmitted feature(s) and to retrieve the values for the non-transmitted feature(s) from the historical database 1022. The reconstructed set of received features $R_N$ is then inputted to the feature decoder 424 to output the set of recovered information $S_L$. It should be noted that because the encoder and decoder DNNs were trained for a set of N features, the feature decoder 424 requires an N-dimensional input for proper decoding.

In the above discussion, by omitting transmission of any feature(s) that has not changed from one data block to the next (or that has no substantial change), transmission resources may be saved. In some examples, because the transmission takes place on a feature-level (rather than transmission of raw information), changes in the raw information that do not significantly change the feature (e.g., a power change in the raw information that still falls within the same probability distribution) do not need to be transmitted, and resources can be saved.

Another type of redundancy is inter-sensor redundancy. Unlike some conventional M2M communications, in the present disclosure the M2M communications involve multiple sensors 110 that cooperate to deliver information about a common observed subject. It is possible that there is some common information observed among the sensors 110 and/or some correlation between the information observed among sensors 110. This type of redundancy may be easier to avoid when considering information on a feature-level rather than on the raw information level.

Figure 11:
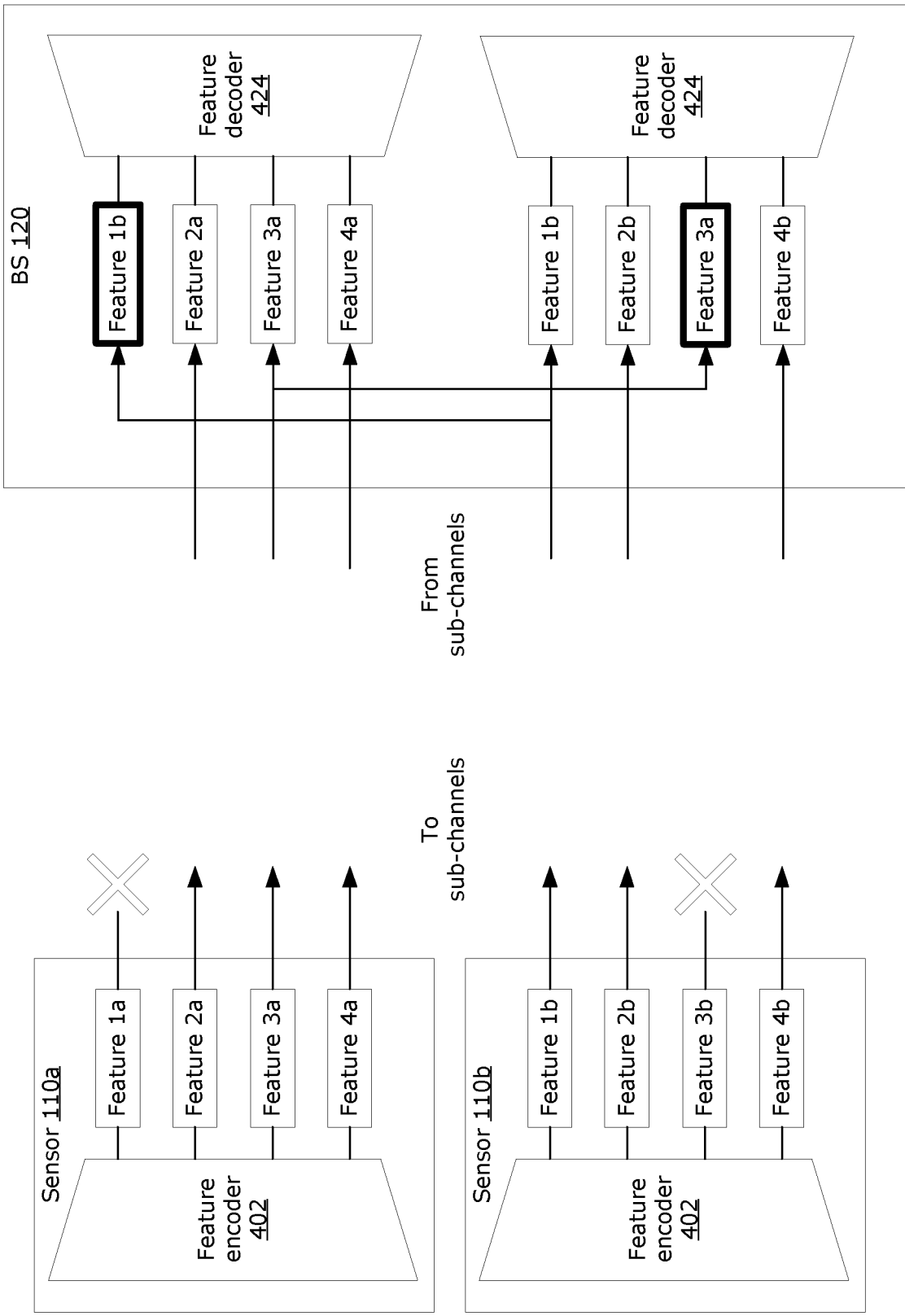
FIG. 11 is a schematic diagram that show two example sensors transmitting information to a base station, illustrating an example method for reducing redundancy.

Reference is now made to FIG. 11, showing two sensors 110a, 110b transmitting information to a BS 120 in the core network. For ease of understanding, the components of the sensors 110a, 110b and the BS 120 have been greatly simplified. For simplicity, only two sensors 110a, 110b are shown, however it should be understood that there may be more than two sensors. Each sensor 110a, 110b implements the same feature encoder 402 (e.g., the sensors 110a, 110b are of the same type) that generates four features (numbered features 1 to 4, and denoted as "a" or "b" for each respective sensor 110a, 110b). The BS 120 decodes each set of features from each respective sensor 110a, 110b using the feature decoder 424. The BS 120 may have two instances of the feature decoder 424 to decode the two sets of features, as illustrated in FIG. 11; in other examples the BS 120 may decode each set of feature in turn using a single feature decoder 424. As previously explained, the quality/variance of each feature may differ between two sensors even if the sensors are of the same type. For example, the first sensor 110a may have a good viewing angle for observing features 2a to 4a, but has a poor viewing angle for observing feature 1a; the second sensor 110b may have a good viewing angle for observing features 1b, 2b and 4b, but has a poor viewing angle for observing feature 3b.

The BS 120 may, during the initiation phase, determine that feature 1a and feature 1b are strongly correlated. For example, the BS 120 may use another machine-learning based process to identify any correlation among features transmitted by the different sensors 110a, 110b. In this example, the BS 120 may find that feature 1a and feature 1b are strongly correlated, with feature 1b having a higher quality than feature 1a; and that feature 3a and feature 3b are strongly correlated, with feature 3a having a higher quality than feature 3b.

This information may be used, for example by the scheduler 140 of the core network 130 (see FIG. 1) to schedule which features should be transmitted by which sensor 110a, 110b. For example, as shown in FIG. 10A, the scheduler 140 may generate and transmit a downlink (DL) control message (e.g., communicated via the BS 120) to each sensor 110a, 110b. In this example, the DL control message to sensor 110a may instruct the reducer 1004 of sensor 110a to omit feature 1a from transmission; and the DL control message to sensor 110b may instruct the reducer 1004 of sensor 110b to omit feature 3b from transmission. The scheduler 140 may make scheduling decisions based on various factors. In the example shown, the scheduler 140 may make scheduling decisions based on the quality of each transmitted feature. In other examples, the scheduler 140 may consider the overall reliability and/or performance of the sensors 110 when determining which sensor 110 should transmit a correlated feature; or the scheduler 140 may consider the power consumption of the sensors 110 when determining which sensor 110 should transmit a correlated feature. This scheduling information may also be provided to the BS 120.

In this example, sensor 110a transmits features 2a, 3a and 4a, and does not transmit feature 1a; sensor 110b transmits features 1b, 2b and 4b, and does not transmit feature 3b. At the BS 120, using information from the scheduler, the set of features from the first sensor 110a is completed by copying feature 1b received from the second sensor 110b. As shown in FIG. 10B, the reconstructor 1024 may use the feature received from the second sensor 110b to reconstruct the set of N features received from the first sensor 110a, and provide the reconstructed features $R_N$ to the feature decoder 424. Similarly, the features from the second sensor 110b may be reconstructed using feature 3a received from the first sensor 110a, and inputted to the feature decoder 424.

Such cooperation among sensors may help to alleviate physical layer transmission overload by identifying any inter-sensor feature redundancy and then scheduling transmission of features properly.

It should be understood that the various disclosed methods for managing different types of redundancies can be used together for increased efficiency. For example, inter-sensor feature redundancy and time-related redundancy can be addressed together. For example, a subject may include background information (e.g., static scenery and/or ambient noise) that is present throughout a time period (e.g., coherent over the duration of a day or an hour) with little or no change. Such background, time-invariant information may be observed by several different sensors from different angles/aspects. The BS may learn (e.g., using a machine-learning algorithm during the initiation phase) that the observed subject includes background, time-invariant information that exhibits inter-sensor feature redundancy and time-related redundancy. This may be used, at the scheduler, to generate DL control messages to certain ones of the sensors to schedule which sensor(s) should transmit the feature(s) related to the background information at what time. At the BS, the background-related feature(s) transmitted by the scheduled sensor(s) may be copied in order to decode the features transmitted by other sensor(s) (e.g., see the example of FIG. 11). The BS may also use stored information from a historical database to fill in the background features that were omitted from transmission (e.g., see the example of FIG. 10B).

The discussion thus far has described the encoder DNN and decoder DNN as being trained to maximize the likelihood between $S_L$ and $\underline{S}_L$, implying that the aim is for the encoded/decoded features to cover the entire raw source information, representing a lossless fidelity (e.g., for humankind sensing satisfaction). However, in some examples an application of the core network, which receives and processes the decoded information, may require only a portion of the raw information. Different applications may be interested in different portions of the features. For example, in the example of a monitored crossroad being the observed subject, an application that simply tracks traffic density at this crossroad may be interested in only one or two features (e.g., number of detected vehicles), but another application that identifies drivers may be interested in more features (e.g., vehicle license plate, vehicle make/color, etc.). Such differences in the needs of different applications give rise to machine-perception redundancy, discussed previously in the present disclosure.

For example, the scheduler may communicate with the applications in the core network to determine the features required by each application. The scheduler may then generate and transmit DL control messages to certain sensor(s) to schedule the sensor(s) to transmit only a designated subset of feature(s). Consider an example where the encoder and decoder DNNs have been trained based on a feature set having four features (i.e., N=4). A first application may require only features 1, 2 and 3, and a second application may require only feature 2. Accordingly, the scheduler may schedule the sensor(s) to transmit only features 1, 2 and 3, and not transmit feature 4. At the BS, in order to decode the received information, the decoder requires a full feature set. Accordingly, the BS may fill the non-transmitted feature(s) with random values or any other pre-defined values, because the non-transmitted feature(s) are not used by the applications.

As previously discussed, the number of features N for the encoder and decoder DNNs is determined to provide an optimal compression ratio for a given channel capacity $C_{limit}$ (e.g., the capacity purchased by a service provider). The upper boundary of the true occupied channel capacity $C_{occupy}$ is the KL divergence value, and must be within $C_{limit}$. It should be noted that $C_{occupy}$ is the maximum occupied channel capacity if all N features are transmitted and received. However, because the applications may require only a portion of the features, rather than all N features, fewer than N features need to be transmitted. This means that, the instant channel capacity $C_{instant}$ can be less than the maximum occupied channel capacity $C_{occupy}$. Accordingly, there may be savings in physical channel resources.

The various example methods for addressing different types of redundancy, as discussed above, may be used in combination. Generally, these example methods may reduce redundancies and reduce the amount of information that needs to be transmitted from the sensors to the core network, over a physical channel. Using the various methods discussed, savings in the physical layer resource may be achieved. The example methods discussed above help to reduce the number of features that need to be transmitted and hence may result in an instant channel capacity $C_{instant}$ that is less than the maximum occupied channel capacity $C_{occupy}$. This helps to illustrate how transmission of features, rather than raw information, may be more efficient and may provide advantages.

In some examples discussed above, the scheduler in the core network manages operation of multiple sensors and enables cooperation among sensors monitoring a common subject. A conventional belief is that the more sensors are deployed to observe a common subject, the better the information about the subject. However, using the approach discussed herein, this may not be the case. For example, if all the feature information generated by a given sensor were correlated to feature information generated by other sensors, then the scheduler may manage that given sensor to be powered down (or that sensor may be omitted from the system entirely) because the information it generates is already generated and transmitted by other sensors.

In another example, if a given sensor generates unique information (i.e., not correlated to information generated by other sensors) but that unique information is only seldom required by an application, then the scheduler may manage that given sensor to be powered down (e.g., in sleep mode) and waken up when the unique information is requested by the application.

In another example, if two sensors (or two groups of sensors) each provide sufficiently good quality information about the subject, the scheduler may manage the two sensors (or two groups of sensors) to alternately gather and transmit information. That is, the scheduler may manage the two sensors (or two groups of sensors) such that, at any given time, one sensor is awake and transmitting information and the other sensor is in sleep mode, then alternate which sensor is awake/asleep.

In another example, consider the case where the feature information generated by two sensors is highly correlated, but the two sensors have different physical layer transmission performance. The scheduler may manage the sensors such that the sensor with poorer physical layer transmission performance is powered down, because the poorer physical layer performance would result in high consumption of that sensor's and the core network's energy and bandwidth, to do signal processing. For sensors (such as IoT devices), a high percentage of energy consumption may be from physical layer transmission. If a first sensor with a poor channel condition generates feature information that is highly correlated with feature information generated by a second sensor with better channel conditions, the scheduler may manage the sensors such that the first sensor does not transmit the highly correlated feature information and may only transmit any features that are not correlated with features from other sensors.

In these ways, the system may manage the sensors such that only the minimum number of sensors need to be active at any time, without compromising the quality of the observed information. Advantages may include power savings at the sensors (this may be particularly useful in examples where the sensors are battery powered or have limited power supply), may include savings in the physical layer resources, and may include savings in the processing resources at the core network. It should be appreciated that other ways of managing sensors can be used, to achieve similar advantages.

It should be understood that some or all of the above-discussed example methods for reducing redundancies may be used independently of the machine-learning based compression techniques described earlier. For example, transmission of any type of information, using any compression technique, may benefit from a scheduling managing cooperation among sensors to reduce redundancies (e.g., inter-sensor redundancy).

The present disclosure has described methods and systems for feature-driven compression in a M2M communications. In particular, a machine-learning based approach is used to train DNNs for implementing probabilistic encoders at the sensors and probabilistic decoders at the core network.

Using appropriate training parameters, the core network may train different encoder/decoder DNN pairs to suit different physical channel capacities, and may generate different information representation and transmission schemes. These schemes may be embodied in the configuration and parameters (e.g., including the compression ratio and sub-channelization) of the trained encoder and decoder DNN pairs.

For a plurality of sensors observing a common subject, the core network provides each sensor with information (e.g., appropriate weights) to implement a respective encoder DNN (e.g., for a particular information representation and transmission scheme). The corresponding decoder DNN may be implemented at the core network (e.g., at the BS that is in communication with the sensors). The sensors may then collect raw information, extract feature(s) from the raw information, and transmit the expectation values of the feature(s) using the transmission scheme (which may be defined by the variance values of the feature(s) in a sub-channelization mode). In other words, instead of transmitting the raw information, the sensors transmit extracted feature(s) that describe probability distributions. Thus, in examples disclosed herein, optimization (including reduction of redundancies) may be based on features rather than the raw information.

In examples described herein, optimization may account for common information captured by multiple sensors observing the same subject, and may also account for correlation of different features among multiple sensors. Each sensor may autonomously determine which features are time-varying (or time-invariant), in order to mainly transmit time-varying features. The core network may also manage sensors so that only feature(s) of interest (e.g., feature(s) relevant to specific applications of the core network) are transmitted by the sensors. The core network may manage the sensors dynamically (e.g., in substantially real-time), such as in response to a current physical channel condition. For example, when the physical channel capacity is temporally reduced, the core network may manage the sensors to temporarily reduce or stop transmission of information about less important features.

Where there are multiple sensors observing the same subject, the sensors may operate in cooperation (e.g., via management by a scheduler in the core network) to provide the core network with required information about the subject. For example, the scheduler in the core network may coordinate operation of the sensors to more efficiently use the physical channel resource, manage latency, and/or manage power consumption of the sensors. For example, the scheduler may evaluate whether feature information requires updating, and may switch on/off certain sensors based on the status of the information and/or current channel conditions.

The present disclosure has described examples in the context of uplink (UL) transmissions from sensors to the core network. However, it should be understood that examples disclosed herein may also be used for sidelink transmissions (e.g., between two sensors), and may also be used for DL transmissions (e.g., from a BS to one or more sensors).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus for feature-based compression, the apparatus comprising:
   a feature encoder configured to extract one or more features from a set of raw information, to generate a set of features that compresses the raw information by a compression ratio that satisfies a predetermined physical channel capacity limit for a transmission channel, each feature providing information about a respective probability distribution that each represents one or more aspects of the subject; and
   a transmitter configured to transmit a reduced set of the features over the transmission channel.

2. The apparatus of claim 1, wherein the feature encoder implements a probabilistic encoder to generate the set of features and the probabilistic encoder is implemented using an encoder deep neural network (DNN), and wherein the encoder DNN is trained to satisfy: a first target of maximizing likelihood between a set of recovered information at a corresponding decoder DNN, and a second target of minimizing an upper boundary of mutual information to be within the predetermined physical channel capacity limit.

3. The apparatus of claim 2, wherein the encoder DNN and the decoder DNN are trained together.

4. The apparatus of claim 2, wherein the compression ratio provided by the trained encoder DNN and the decoder DNN has been determined by performing training on a plurality of candidate encoder and decoder DNN pairs, each candidate encoder and decoder DNN pair providing a respective different compression ratio, and selecting the candidate encoder and decoder DNN pair and associated compression ratio that minimizes the upper boundary of mutual information.

5. The apparatus of claim 1, wherein the reduced set of features omit a correlated feature of the set of features.

6. The apparatus of claim 5, further comprising:
   a historical database storing at least one previously transmitted feature; and
   wherein the correlated feature is any feature that is unchanged compared to the at least one previously transmitted feature.

7. The apparatus of claim 5, wherein the correlated feature is indicated by a control message.

8. The apparatus of claim 1, wherein the transmitter is configured to:
   assign a sub-channel for transmission of each respective feature, the assigning being based on a relative importance of each feature; and
   transmit the set of features over the sub-channels.

9. The apparatus of claim 8 wherein each feature indicates an expectation value of the respective probability distribution and a variance value of the respective probability distribution, and the relative importance of each feature is determined based on the variance value of each respective feature.

10. The apparatus of claim 9 wherein the transmitter is further configured to:
    select a transmission scheme for each assigned sub-channel, the transmission scheme being selected to indicate the variance value of the feature assigned to each respective sub-channel; and
    transmit the expectation value of each feature over the respective sub-channel in accordance with the respective transmission scheme.

11. The apparatus of claim 10 wherein the transmitter is further configured to:
    generate a control message or header indicating the selected transmission scheme and assigned sub-channel for each feature; and
    transmit the control message or header.

12. The apparatus of claim 9, wherein a first feature having a first variance value and a second feature having a second variance value similar to the first variance value are assigned to the same sub-channel for transmission.

13. A method for managing a plurality of sensors monitoring a common subject, each sensor generating and transmitting a respective set of features representing one or more aspects of the subject, the method comprising:
    determining a correlated feature that is highly correlated between a first set of features generated by a first sensor and a second set of features generated by a second sensor;
    generating a control message to the first sensor to cause the first sensor to omit the correlated feature from transmission; and
    reconstructing the first set of features from a transmission from the first sensor by filling in the omitted correlated feature.

14. The method of claim 13, wherein the first set of features is reconstructed by copying the correlated feature from the second set of features received from the second sensor.

15. The method of claim 13, further comprising:
    determining that the correlated feature is a background feature that is unchanged over a predetermined time period; and
    wherein the first set of features is reconstructed by copying the correlated feature from a historical database containing a previously transmitted instance of the background feature.

16. The method of claim 15, wherein a same or different control message is generated to cause the first sensor and the second sensor to omit the background feature from transmission.

17. The method of claim 13, further comprising:
    determining a requested set of features that is requested by an application, wherein the requested set of features is a subset of the first set of features;
    generating the control message to the first sensor to cause the first sensor to transmit only the subset of features; and
    reconstructing the first set of features from a transmission from the first sensor by filling in untransmitted features with random values.

18. The method of claim 13, wherein a same or different control message is generated to cause the first sensor and the second sensor to alternately transmit or omit the correlated feature.

19. The method of claim 13, wherein all features in the first set of features are highly correlated with the second set of features, and wherein the control message causes the first sensor to enter a sleep mode.

20. The method of claim 13, wherein the first sensor has a poorer physical layer transmission performance than the second sensor.

* * * * *